US012698683B2

(12) United States Patent
Mantovano et al.

(10) Patent No.: US 12,698,683 B2
(45) Date of Patent: *Aug. 4, 2026

(54) THREADED CONNECTION FOR EXPLORATION AND PRODUCTION OF A HYDROCARBON WELL

(71) Applicant: TENARIS CONNECTIONS B.V., Amsterdam (NL)

(72) Inventors: Luciano Omar Mantovano, Buenos Aires (AR); Gaston Mauro Mazzaferro, Buenos Aires (AR); Julian Ignacio Zabaloy, Buenos Aires (AR)

(73) Assignee: Tenaris Connections B.V., Amsterdam (NL)

( * ) Notice: Subject to any disclaimer, the term of this patent is extended or adjusted under 35 U.S.C. 154(b) by 0 days.

This patent is subject to a terminal disclaimer.

(21) Appl. No.: 18/914,873

(22) Filed: Oct. 14, 2024

(65) Prior Publication Data

US 2025/0034953 A1     Jan. 30, 2025

Related U.S. Application Data

(63) Continuation of application No. 18/005,449, filed as application No. PCT/EP2021/069974 on Jul. 16, 2021, now Pat. No. 12,116,848.

(30) Foreign Application Priority Data

Jul. 17, 2020     (NL) ...................................... 2026082

(51) Int. Cl.
*E21B 17/043*     (2006.01)
*E21B 17/042*     (2006.01)
(Continued)

(52) U.S. Cl.
CPC ........ *E21B 17/043* (2013.01); *E21B 17/0426* (2013.01); *E21B 17/06* (2013.01); *F16L 15/08* (2013.01)

(58) Field of Classification Search
CPC ..................................................... E21B 17/043
See application file for complete search history.

(56) References Cited

U.S. PATENT DOCUMENTS 12,116,848 B2 * 10/2024 Mantovano ......... E21B 17/0426
2014/0103640 A1     4/2014 O'Dell
(Continued)

FOREIGN PATENT DOCUMENTS

GB          2559688          8/2018

OTHER PUBLICATIONS

Patent Cooperation Treaty; PCT/EP2021/069974; International Search Report and Written Opinion, Nov. 18, 2021.

*Primary Examiner* — Giovanna Wright
(74) *Attorney, Agent, or Firm* — Morgan, Lewis & Bockius LLP

(57) ABSTRACT

Threaded connection for exploration and production of a hydrocarbon well, said threaded connection including a pin including an outer pin surface provided with an external thread, a box including an inner box surface provided with an internal thread for mating with the external thread during rotational make-up of the threaded connection, and an anti-rotation device to allow relative rotation between the pin and the box in a make-up rotation direction and prevent relative rotation between the pin and the box in an opposite break-out rotation direction, wherein the pin and the box extend along a longitudinal axis, the anti-rotation device includes a releasable mounted first anti-rotation member which is arranged in a first radial recess provided in one of the outer pin surface and the inner box surface, and a second (Continued)

anti-rotation member provided at the other of the outer pin
surface and the inner box surface.

15 Claims, 41 Drawing Sheets

(51) Int. Cl.
  *E21B 17/06*          (2006.01)
  *F16L 15/08*          (2006.01)

(56)                    References Cited

U.S. PATENT DOCUMENTS

| 2014/0103645 | A1 | 4/2014 | Steen |
| 2014/0167408 | A1 | 6/2014 | Steen |
| 2016/0076316 | A1 | 3/2016 | Gallagher |
| 2017/0101828 | A1 | 4/2017 | McGowan |
| 2018/0230758 | A1 | 8/2018 | Nelson |
| 2018/0231155 | A1 | 8/2018 | Ellisor |

* cited by examiner

Figure 4D:
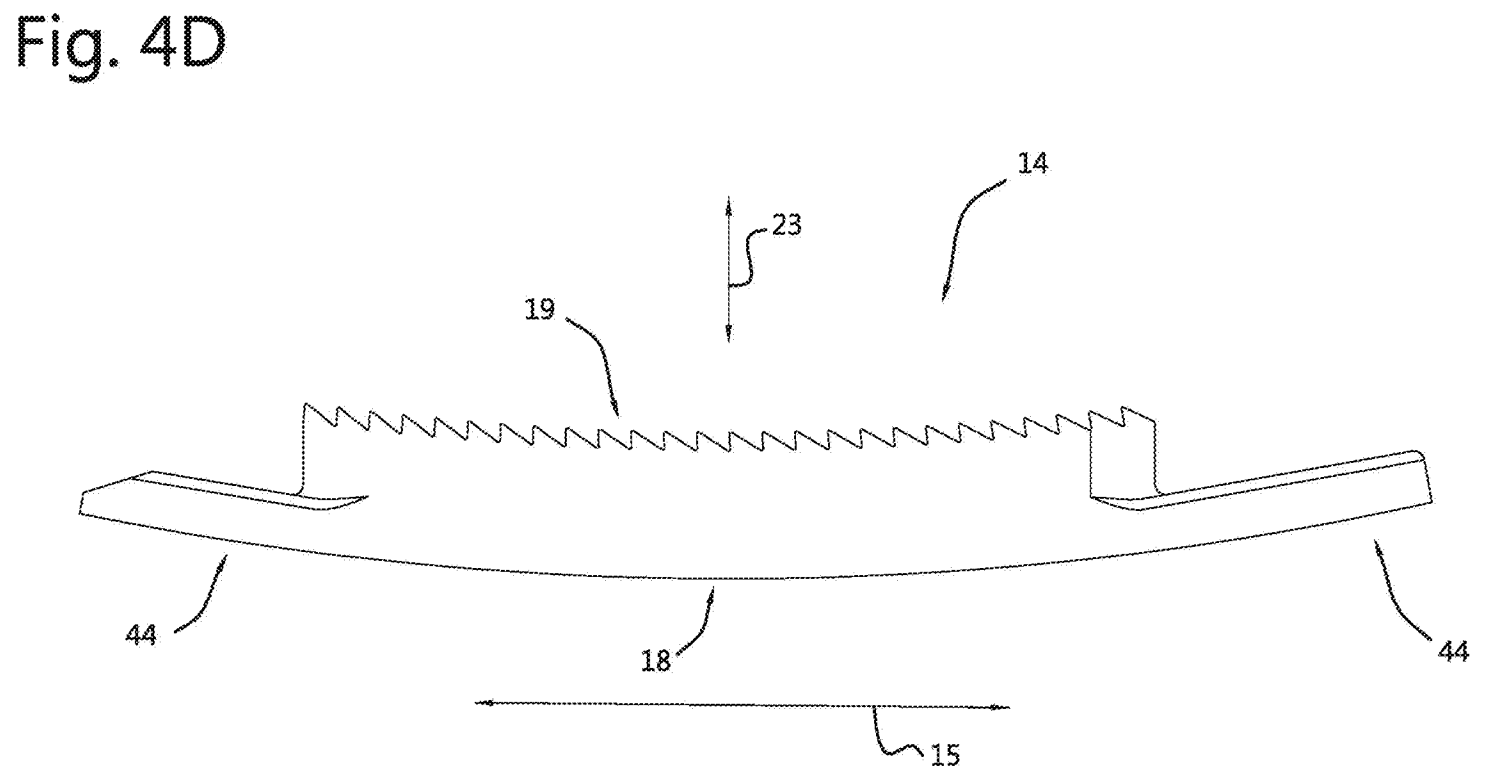

Figure 13D:
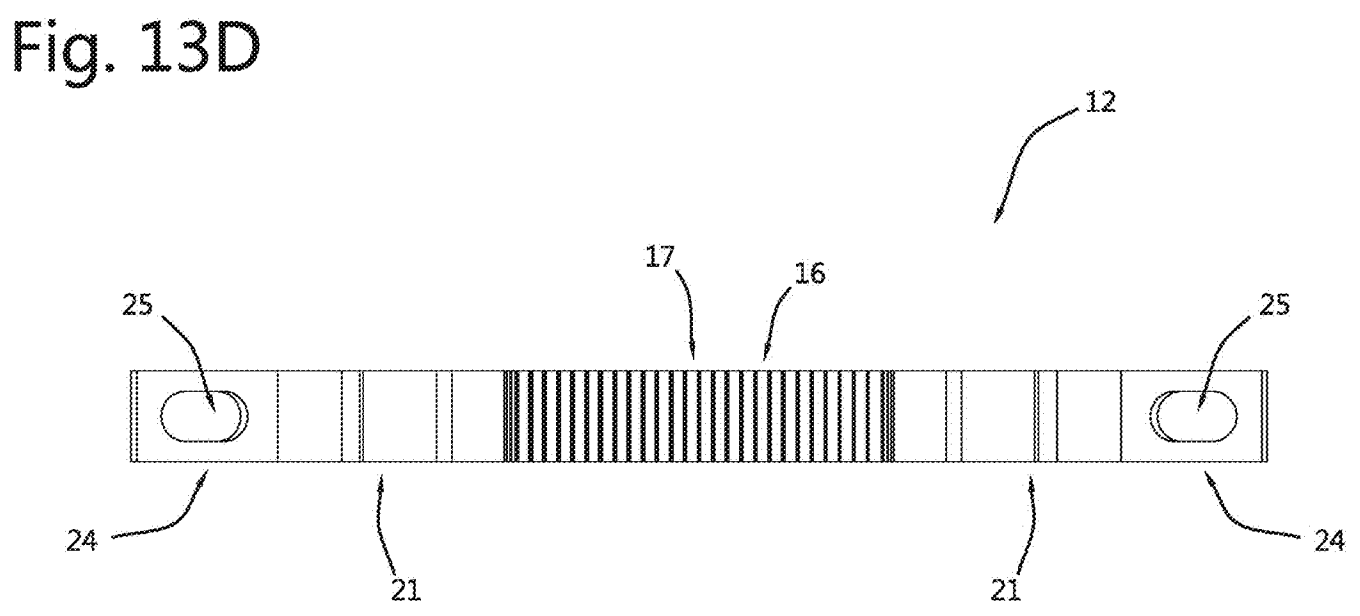

THREADED CONNECTION FOR EXPLORATION AND PRODUCTION OF A HYDROCARBON WELL

FIELD OF THE INVENTION

The invention relates to a threaded connection for exploration and production of a hydrocarbon well.

The threaded connection comprises a pin comprising an outer pin surface provided with an external thread, a box comprising an inner box surface provided with an internal thread for mating with the external thread during rotational make-up of the threaded connection, and an anti-rotation device to allow relative rotation between the pin and the box in a make-up rotation direction and prevent relative rotation between the pin and the box in an opposite break-out rotation direction.

The first anti-rotation member comprises a first ratchet part provided with radially extending first ratchet teeth, and the second anti-rotation member comprises a second ratchet part provided with radially extending second ratchet teeth which engage the first ratchet teeth of the first anti-rotation member at final make-up of the threaded connection.

Spring means are provided which allows radial movement of the first ratchet part in radial direction relative to the longitudinal axis of the threaded connection when first ratchet teeth slide along second ratchet teeth during relative rotation between the pin and the box in the make-up rotation direction.

The pin and the box of the threaded connection are generally formed at the end sections of longitudinal tubular members suitable for transporting a medium, such as a liquid of gas. For exploration and production of a hydrocarbon well, the end sections of said tubular members are connected with each other to form a string of tubular members to transport said medium. Said tubular member can have at an end section thereof a pin, and at an opposite end section thereof another pin. Alternatively, said tubular member can have at an end section thereof a pin, and at an opposite end section thereof a box. It is also possible that said tubular member is provided with a box at an end section of said tubular member, and with another box at an opposite end section of said tubular member.

BACKGROUND OF THE INVENTION

This type of anti-rotation device having the first anti-rotation member provided with the first ratchet part, the second anti-rotation member provided with the second ratchet part, and the spring means allow that the anti-rotation device is activated by rotational make-up of the threaded connection until final make-up is reached.

SUMMARY OF THE INVENTION

The known threaded connections have the disadvantage that the anti-rotation device is relatively susceptible to damage. Damage may occur when the anti-rotation device is subjected to forces, for example during rotational make-up of the threaded connection and when preventing relative rotation between the pin and the box in the break-out rotation direction.

BRIEF DESCRIPTION OF THE INVENTION

The invention has the objective to provide an improved, or at least alternative, threaded connection for exploration and production of a hydrocarbon well. Said threaded connection comprises:

a pin comprising an outer pin surface provided with an external thread, a box comprising an inner box surface provided with an internal thread for mating with the external thread during rotational make-up of the threaded connection, and an anti-rotation device to allow relative rotation between the pin and the box in a make-up rotation direction and prevent relative rotation between the pin and the box in an opposite break-out rotation direction, wherein:

the pin and the box extend along a longitudinal axis, the anti-rotation device comprises a releasable mounted first anti-rotation member which is arranged in a first radial recess provided in one of the outer pin surface of the pin and the inner box surface of the box, and a second anti-rotation member provided at the other of the outer pin surface of the pin and the inner box surface of the box, the first anti-rotation member comprises a first ratchet part provided with radially extending first ratchet teeth, the second anti-rotation member comprises a second ratchet part provided with radially extending second ratchet teeth which engage the first ratchet teeth of the first anti-rotation member at final make-up of the threaded connection, the first anti-rotation member comprises a spring part which allows radial movement of the first ratchet part in radial direction relative to the longitudinal axis when first ratchet teeth slide along second ratchet teeth during relative rotation between the pin and the box in the make-up rotation direction, and the first ratchet part and the spring part of the first anti-rotation member are integrally formed.

By providing a threaded connection for exploration and production of a hydrocarbon well, wherein said first ratchet part and said spring part of said first anti-rotation member are integrally formed, a relatively robust anti-rotation device may be provided. As said first ratchet part and said spring part are formed from a single piece of material, a homogeneous anti-rotation member is provided. Such homogeneous anti-rotation member may provide a strong material connection between said first ratchet part and said spring part. Accordingly, said device may be less susceptible to damage, and thus a relatively robust anti-rotation device can be provided.

Differently put; as the first ratchet part and the spring part are formed from a single piece of material, the first anti-rotation member may be free from connection components, e.g. a screw, connecting the first ratchet part with the spring part. The invention is amongst others based on the obtained insight that such connection components may be particularly susceptible to material deformations caused by shear stresses, in particular when the first anti-rotation member is subjected to a relatively large break-out torque in the break-out direction. By omitting the presence of such connection components, damage to these connection components may be prevented.

In an embodiment of the threaded connection according to the invention, the spring part has a spring stiffness which is smaller than a first ratchet stiffness of the first ratchet part. The spring part may have a spring part section having a radial spring thickness that is smaller than a radial first ratchet thickness of the first ratchet part.

In an embodiment of the threaded connection according to the invention, the first anti-rotation member comprises a first mounting part to releasable mount the first anti-rotation member in the first radial recess.

In an embodiment of the threaded connection according to the invention, the first mounting part comprises a first mounting through hole to receive a first mounting member, such as a first screw, which releasable mounts the first anti-rotation member to said one of the pin and box in which the first radial recess is provided.

In an embodiment of the threaded connection according to the invention, the first ratchet part, the spring part and the first mounting part of the first anti-rotation member are integrally formed.

In an embodiment of the threaded connection according to the invention, the spring part has a spring stiffness which is smaller than a first ratchet stiffness of the first ratchet part and/or smaller than a first mounting stiffness of the first mounting part. The spring part may have a spring part section having a radial spring thickness that is smaller than a radial first ratchet thickness of the first ratchet part and/or smaller than a radial first mounting thickness of the first mounting part.

In an embodiment of the threaded connection according to the invention, a first recess contact surface of the pin and the box in which the first radial recess is provided defines a first recess boundary of the first radial recess, the first anti-rotation member comprises a first member contact surface facing the first recess contact surface, and the first mounting part is configured to allow tangential movement in a tangential direction relative to the longitudinal axis of the first anti-rotation member in the first radial recess from a first tangential member position wherein the first member contact surface of the first anti-rotation member is in contact with the first recess contact surface into a second tangential member position wherein the first member contact surface of the first anti-rotation member is located at a first tangential member distance from the first recess contact surface, and vice versa.

This has the advantage that the anti-rotation device may be even less susceptible to damage. As the first mounting part is configured to allow tangential movement (e.g. to allow sliding movement) of the first anti-rotation member from said first tangential member position to said second tangential member position stresses in the material may be directed away from said first mounting part (and a first mounting member, e.g. a screw, provided in said first mounting part) wherein there are relatively few stresses present at said first mounting part. As such, said first mounting part may be substantially free from (shear) stresses. In particular, said anti-rotation device may be configured to allow said first recess contact surface and said first member contact surface to abut while said teeth limit rotation of the pin with respect to the box in the break-out direction. As such, relatively few connection parts (e.g. said first mounting part) may be subjected to stresses under the influence of a break-out torque.

The tangential movement in tangential direction is not restricted to movement only in tangential direction relative to the longitudinal axis. It may have a certain degree of movement in other directions relative to the longitudinal axis, for example to create a movement partly around the longitudinal axis.

In an embodiment of the threaded connection according to the invention, the first recess contact surface and the first member contact surface are configured to distribute forces as a result of a break-out torque applied to the pin and the box in the break-out rotation direction mainly through the teeth of the first ratchet part and the second ratchet part.

In an embodiment of the threaded connection according to the invention, the first recess contact surface and the first member contact surface are configured to direct (e.g. guide) forces from the first ratchet teeth of the first ratchet part towards the second ratchet teeth of the second ratchet part and/or from the second ratchet teeth of the second ratchet part towards the first ratchet teeth of the first ratchet part.

In an embodiment of the threaded connection according to the invention, the recess contact surface is faced towards the first ratchet part.

In an embodiment of the threaded connection according to the invention, the first recess contact surface is faced towards the first ratchet part and the second ratchet part.

In an embodiment of the threaded connection according to the invention, the second anti-rotation member is configured to push the first anti-rotation member into the second tangential member position when a predetermined make-up torque is applied to the pin and the box in the make-up rotation direction, and into the first tangential member position when a predetermined break-out torque is applied to the pin and the box in the break-out rotation direction.

In an embodiment of the threaded connection according to the invention, second ratchet teeth which engage first ratchet teeth push the first anti-rotation member into the second tangential member position when the predetermined make-up torque is applied, and into the first tangential member position when the predetermined break-out torque is applied.

In an embodiment of the threaded connection according to the invention, the first recess contact surface and the first member contact surface are configured to create a radial counter force acting against radial movement of the first ratchet part in radial direction relative to the longitudinal axis when the first anti-rotation member is located in the first tangential member position and a break-out torque is applied to the pin and the box in the break-out rotation direction.

In an embodiment of the threaded connection according to the invention, the radial counter force is formed by a friction force between the first recess contact surface and the first member contact surface when the break-out torque is applied to the pin and the box in the break-out rotation direction.

In an embodiment of the threaded connection according to the invention, the first mounting through hole is in tangential direction relative to the longitudinal axis larger than a first mounting portion of the first mounting member being surrounded by the first mounting through hole to allow movement of the first anti-rotation member in tangential direction and relative to the first mounting member.

In an embodiment of the threaded connection according to the invention, the first mounting through hole has an elongate form in tangential direction relative to the longitudinal axis or a circular form.

In an embodiment of the threaded connection according to the invention, the first recess contact surface and the first member contact surface are configured to block tangential movement of the first anti-rotation member beyond the first tangential member position when a break-out torque is applied to the pin and the box in the break-out rotation direction.

In an embodiment of the threaded connection according to the invention, the first mounting through hole is dimensioned to avoid forces in tangential direction working on the first mounting member by the first anti-rotation member being located in the first tangential member position when a break-out torque is applied to the pin and the box in the break-out rotation direction.

In an embodiment of the threaded connection according to the invention, the first tangential member distance allows radial movement of the first ratchet part in radial direction relative to the longitudinal axis when first ratchet teeth slide along second ratchet teeth during relative rotation between the pin and the box in the make-up rotation direction.

In an embodiment of the threaded connection according to the invention, the first mounting part comprises a first mounting slide surface surrounding the first mounting through hole and being in contact with a corresponding first recess slide surface provided at the first radial recess to facilitate the tangential movement of the first anti-rotation member from the first tangential member position into the second tangential member position, and vice versa.

In an embodiment of the threaded connection according to the invention, the spring part of the first anti-rotation member is in tangential direction relative to the longitudinal axis located between the first ratchet part and the first mounting part.

In an embodiment of the threaded connection according to the invention, the first member contact surface of the first anti-rotation member is located at the first ratchet part and the first ratchet teeth are in tangential direction relative to the longitudinal axis located between the first member contact surface and the spring part.

In an embodiment of the threaded connection according to the invention, a radial first ratchet thickness of the first ratchet part increases in tangential direction relative to the longitudinal axis from the spring part to the first member contact surface.

In an embodiment of the threaded connection according to the invention, the first anti-rotation member is only mounted to said one of the pin and the box in which the first radial recess is provided via the first mounting part.

In an embodiment of the threaded connection according to the invention, the first anti-rotation member comprises one, and only one, first mounting part. In particular, said first anti-rotation member comprises a single mounting part. Even more in particular, said first anti-rotation member comprises at one end said first mounting part and at a further end, being opposite to said one end, said first ratchet part, wherein said first ratchet part is a free end of said first anti-rotation member. As such, said first ratchet part is free from mounting elements. Accordingly, said first anti-rotation member may be arranged as a cantilever beam.

In an embodiment of the threaded connection according to the invention, the first anti-rotation member comprises one, and only one, spring part. In particular, said spring part starts at said first mounting part and ends at said first ratchet part. As such, said spring part is located (substantially) between said mounting part and said first ratchet part. Even more in particular, said first anti-rotation member comprises said first mounting part at said one end, and said first ratchet part at said further end, wherein said spring part is located (substantially) between said first mounting part and said first ratchet part. As such, a flexible cantilever beam is provided.

In an embodiment of the threaded connection according to the invention, the second ratchet part of the second anti-rotation member is fixed in radial direction relative to the longitudinal axis In an embodiment of the threaded connection according to the invention, the second anti-rotation member is releasable mounted in a second radial recess provided in said other of the outer pin surface of the pin and the inner box surface of the box.

In an embodiment of the threaded connection according to the invention, the first anti-rotation member is arranged in the first radial recess being provided in the outer pin surface of the pin, and the second anti-rotation member is provided at the inner box surface of the box.

This has the advantage that a relatively robust and sustainable threaded connection may be provided. By having the first anti-rotation member located in the pin, the first anti-rotation member may be kept within the outer dimensions of the threaded connection, even when the first anti-rotation member is pushed in a radially outwards direction with respect to the longitudinal axis of the threaded connection. In other words; the first anti-rotation member may be arranged wherein radial movement of the first anti-rotation member does not lead to a situation wherein the first anti-rotation member extends radially outwards beyond the outer diameter of the box. Said outer diameter of said threaded connection may be defined by the outer dimensions of said box in radial direction with respect to said longitudinal axis of said box. In addition, the mounting elements for mounting the first anti-rotation member to the pin, also extend within the outer dimensions of the connection. As such, the mounting elements will also not extend radially beyond the outer diameter of the box. Further, the insight was obtained that with said first anti-rotation member being accommodated in said pin, the movable components (e.g. said spring part) are generally less exposed to environmental influences (e.g. to the dirty environment at a bore well).

In an embodiment of the threaded connection according to the invention, the second anti-rotation member is releasable mounted in a second radial recess being provided in the inner box surface of the box.

In an embodiment of the threaded connection according to the invention, the second radial recess comprises a second recess through hole in which the second ratchet part of the second anti-rotation member is located.

In an embodiment of the threaded connection according to the invention, the second anti-rotation member comprises at least one second mounting part to releasable mount the second anti-rotation member to the box.

In an embodiment of the threaded connection according to the invention, the box comprises an outer box surface and the at least one second mounting part is releasable mounted to the box at the outer box surface.

In an embodiment of the threaded connection according to the invention, the second anti-rotation member comprises two second mounting parts to releasable mount the second anti-rotation member to the box.

In an embodiment of the threaded connection according to the invention, the two second mounting parts are located at opposite sides of the second radial recess.

In an embodiment of the threaded connection according to the invention, the first anti-rotation member is arranged in the first radial recess being provided in the inner box surface of the box, and the second anti-rotation member is provided at the outer pin surface of the pin.

In an embodiment of the threaded connection according to the invention, the second anti-rotation member is releasable mounted in a second radial recess being provided in the outer pin surface of the pin.

In an embodiment of the threaded connection according to the invention, the first radial recess comprises a first recess through hole in which the first ratchet part of the first anti-rotation member is located.

In an embodiment of the threaded connection according to the invention, the first anti-rotation member comprises at least one first mounting part to releasable mount the first anti-rotation member to the box.

In an embodiment of the threaded connection according to the invention, the box comprises an outer box surface and the at least one first mounting part is releasable mounted to the box at the outer box surface.

In an embodiment of the threaded connection according to the invention, the first anti-rotation member comprises two first mounting parts to releasable mount the first anti-rotation member to the box.

In an embodiment of the threaded connection according to the invention, the two first mounting parts are located at opposite sides of the first radial recess.

In an embodiment of the threaded connection according to the invention, the first anti-rotation member comprises two spring parts which together allow radial movement of the first ratchet part in radial direction relative to the longitudinal axis when first ratchet teeth slide along second ratchet teeth during relative rotation between the pin and the box in the make-up rotation direction.

In an embodiment of the threaded connection according to the invention, each spring part is located between the first ratchet part and a different one of the two first mounting parts.

In an embodiment of the threaded connection according to the invention, each spring part has a varying radial spring thickness, such as two radially narrowed sections. In particular, the radial spring thickness of the spring parts may be smaller than a radial first ratchet thickness of the first ratchet part and/or a radial first mounting thickness of the first mounting parts.

In an embodiment of the threaded connection according to the invention, the anti-rotation device is configured to be activated by relative rotation between the pin and the box in the make-up rotation direction until final make-up of the threaded connection is reached.

In an embodiment of the threaded connection according to the invention, the first ratchet teeth and the second ratchet teeth extend in opposite radial directions relative to the longitudinal axis when engaging each other at final make-up of the threaded connection.

In an embodiment of the threaded connection according to the invention, the first radial recess extends along part of a circumference of said one of the outer pin surface of the pin and the inner box surface of the box.

In an embodiment of the threaded connection according to the invention, the second radial recess extends along part of a circumference of said other of the outer pin surface of the pin and the inner box surface of the box.

In an embodiment of the threaded connection according to the invention, the radial movement relative to the longitudinal axis of the first ratchet part moves the first ratchet teeth radially relative to the second ratchet teeth.

It will be clear to the skilled person that the threaded connection according to the invention may comprise the features of any combination of the above described embodiments of the threaded connection according to the invention.

The invention further relates to a method of making up a threaded connection for exploration and production of a hydrocarbon well, comprising the step of activating the anti-rotation device of the threaded connection according to the invention by relative rotation between the pin and the box in the make-up rotation direction until final make-up of the threaded connection is reached.

The invention further relates to an anti-rotation device for a threaded connection for exploration and production of a hydrocarbon well, said threaded connection comprising a pin comprising an outer pin surface provided with an external thread, and a box comprising an inner box surface provided with an internal thread for mating with the external thread during rotational make-up of the threaded connection, which pin and the box extend along a longitudinal axis, and wherein:

the anti-rotation device is configured to allow relative rotation between the pin and the box in a make-up rotation direction and prevent relative rotation between the pin and the box in an opposite break-out rotation direction, the anti-rotation device comprises a releasable mounted first anti-rotation member which is arranged in a first radial recess provided in one of the outer pin surface of the pin and the inner box surface of the box, and a second anti-rotation member provided at the other of the outer pin surface of the pin and the inner box surface of the box, the first anti-rotation member comprises a first ratchet part provided with radially extending first ratchet teeth, the second anti-rotation member comprises a second ratchet part provided with radially extending second ratchet teeth which engage the first ratchet teeth of the first anti-rotation member at final make-up of the threaded connection, the first anti-rotation member comprises a spring part which allows radial movement of the first ratchet part in radial direction relative to the longitudinal axis when first ratchet teeth slide along second ratchet teeth during relative rotation between the pin and the box in the make-up rotation direction, and the first ratchet part and the spring part of the first anti-rotation member are integrally formed.

It will be clear to the skilled person that the anti-rotation device according to the invention may comprise the features relating to the anti-rotation device of any combination of the above described embodiments of the threaded connection according to the invention.

BRIEF DESCRIPTION OF THE DRAWINGS

Embodiments of the threaded connection, the anti-rotation device, and the method according to the invention will be described by way of example only, with reference to the accompanying schematic drawings in which corresponding reference symbols indicate corresponding parts, and in which.

DETAILED DESCRIPTION OF THE DRAWINGS

Figure 1:
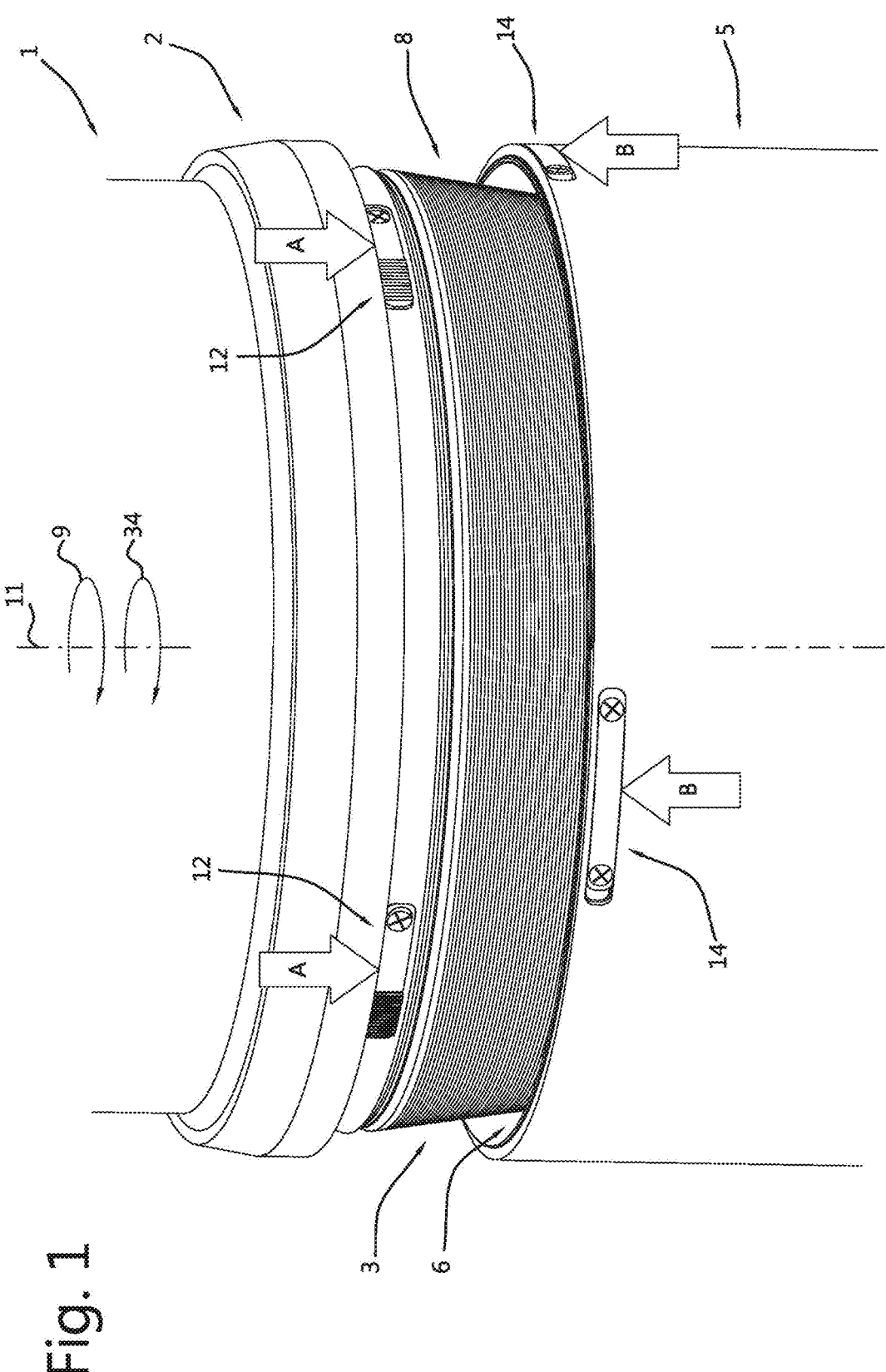
FIG. 1 schematically shows a view in perspective of an embodiment of the threaded connection according to the invention at the start of rotational make-up of the threaded connection, FIG. 2 schematically shows a view in perspective of the threaded connection of FIG. 1 at final make-up of the threaded connection, the FIGS. 3A and 3B schematically show views in perspective of the first anti-rotation member of the anti-rotation device of the threaded connection of FIG. 1, FIG. 3C schematically shows a top view of the first anti-rotation member of FIG. 3A, FIG. 3D schematically shows a side view of the first anti-rotation member of FIG. 3A, FIG. 3E schematically shows a bottom view of the first anti-rotation member of FIG. 3A, FIGS. 4A and 4B schematically show views in perspective of the second anti-rotation member of the anti-rotation device of the threaded connection of FIG. 1, FIG. 4C schematically shows a top view of the second anti-rotation member of FIG. 4A, FIG. 4D schematically shows a side view of the second anti-rotation member of FIG. 4A, FIG. 4E schematically shows a bottom view of the second anti-rotation member of FIG. 4A, FIG. 5 schematically shows an exploded view in perspective of the first anti-rotation member and the first radial recess provided in the pin of the threaded connection of FIG. 1, FIG. 6A schematically shows a view in perspective of the first anti-rotation member arranged in the first radial recess provided in the pin of the threaded connection of FIG. 1, FIG. 6B schematically shows a top view of FIG. 6A, FIG. 6C schematically shows a side view of FIG. 6A, FIG. 7 schematically shows an exploded view in perspective of the second anti-rotation member and the second radial recess provided in the box of the threaded connection of FIG. 1, FIG. 8 schematically shows a view in perspective of the second anti-rotation member arranged in the second radial recess provided in the box of the threaded connection of FIG. 1, FIG. 9A schematically shows another view in perspective of the second anti-rotation member arranged in the second radial recess provided in the box of the threaded connection of FIG. 1, FIG. 9B schematically shows a top view of FIG. 9A, FIG. 9C schematically shows a side view of FIG. 9A, FIG. 10 schematically shows a view in perspective of the first anti-rotation member arranged in the first radial recess provided in the pin and the second anti-rotation member arranged in the second radial recess provided in the box of the threaded connection of FIG. 1, the FIGS. 11A-11G schematically show views in cross section of part of the threaded connection of FIG. 1 wherein the anti-rotation device is activated by rotational make-up of the threaded connection until final make-up is reached, FIG. 12 schematically shows a view in cross section of part of threaded connection of FIG. 1 at final make-up and indicating a finite element analysis in the situation that a break-out torque is applied to the pin and the box in the break-out rotation direction, the FIGS. 13A-D schematically show views of the first anti-rotation member of an alternative embodiment of the threaded connection according to the invention, the FIGS. 14A-B schematically show views of the first radial recess provided in the box of the alternative embodiment of the threaded connection of FIG. 13A-D, the FIGS. 15A-B schematically show views of the first anti-rotation member of the FIGS. 13A-D arranged in the first radial recess of the FIGS. 14A-B.
Figure 2:
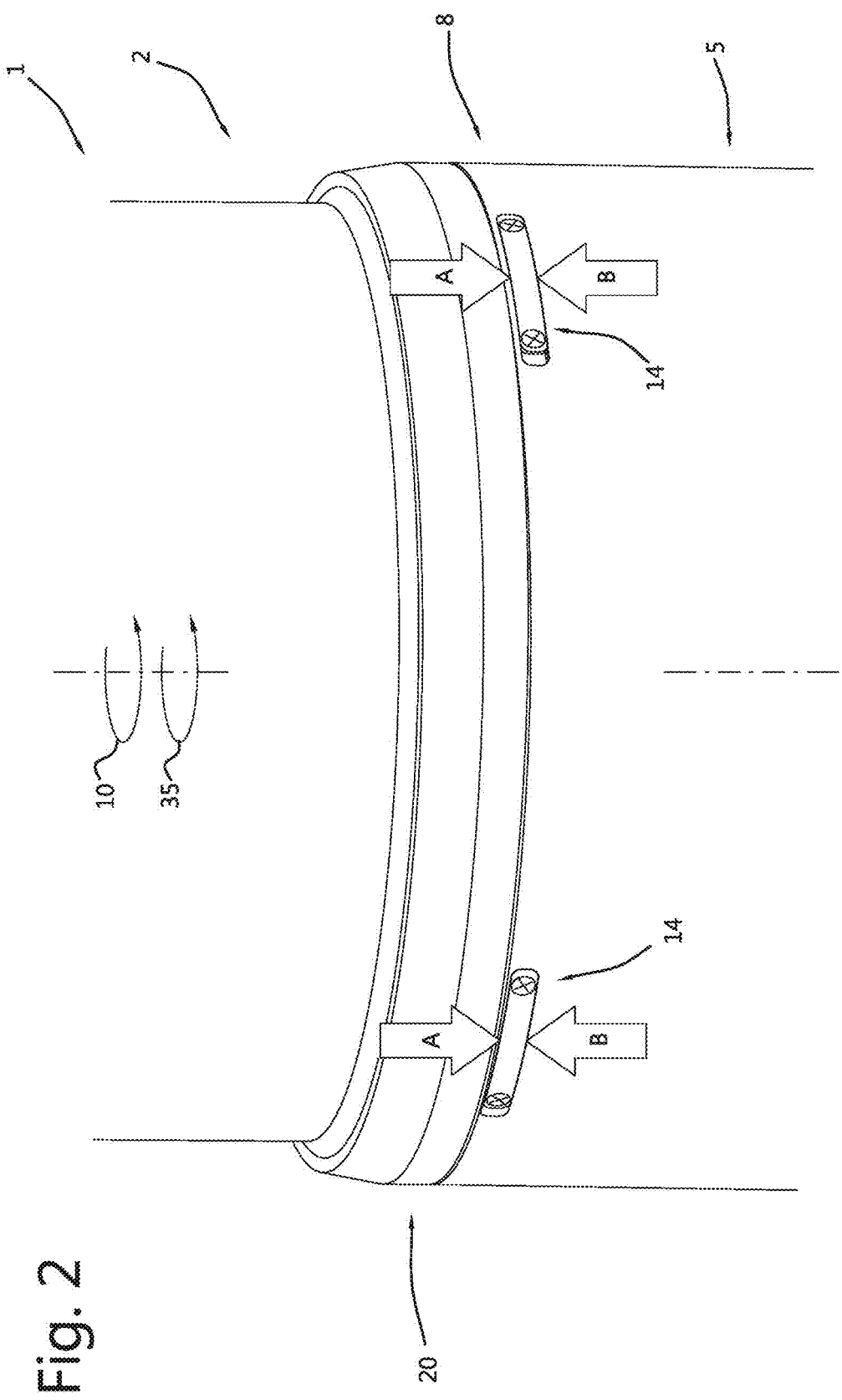
Figure 3A:
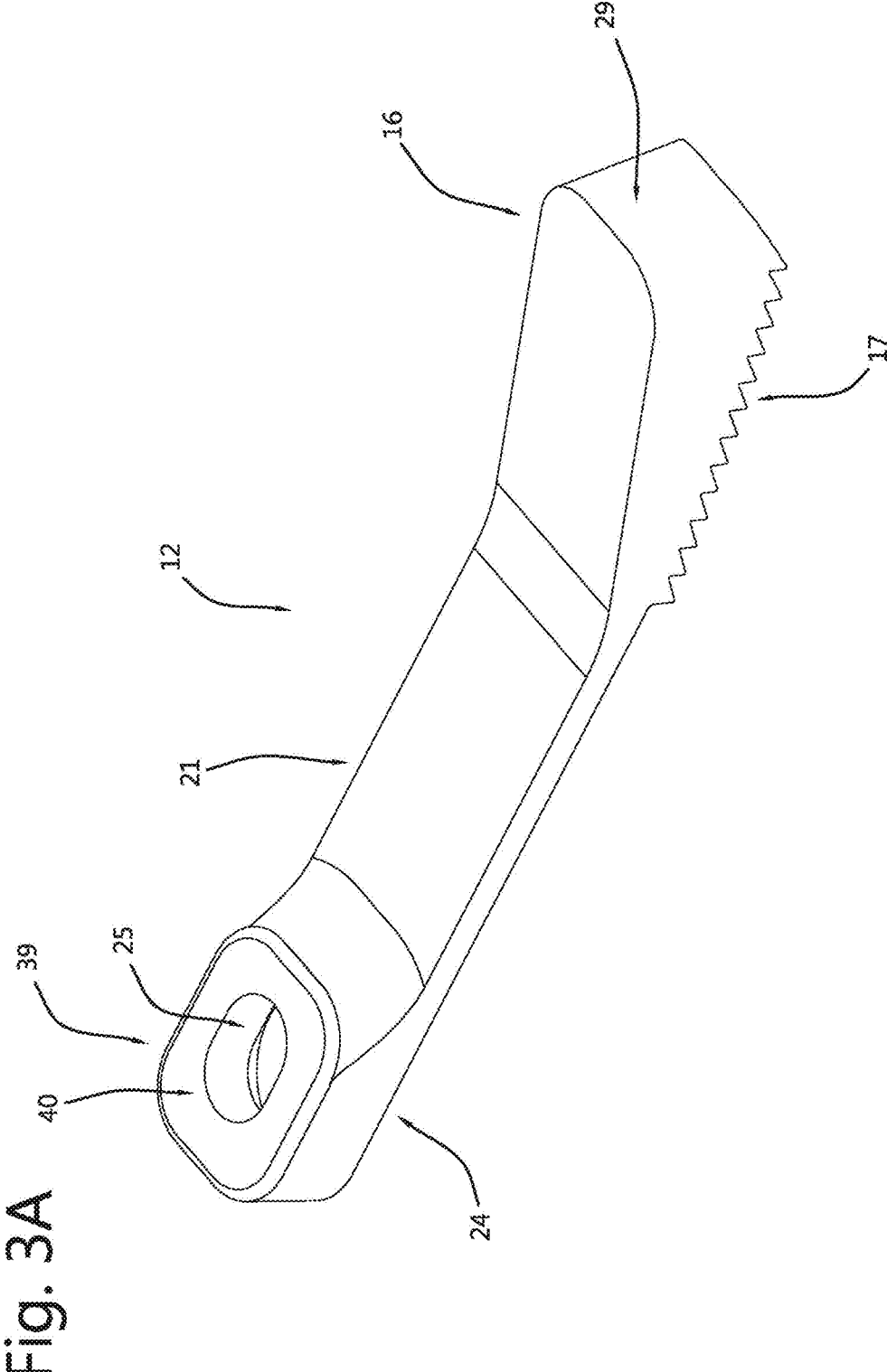
Figure 3B:
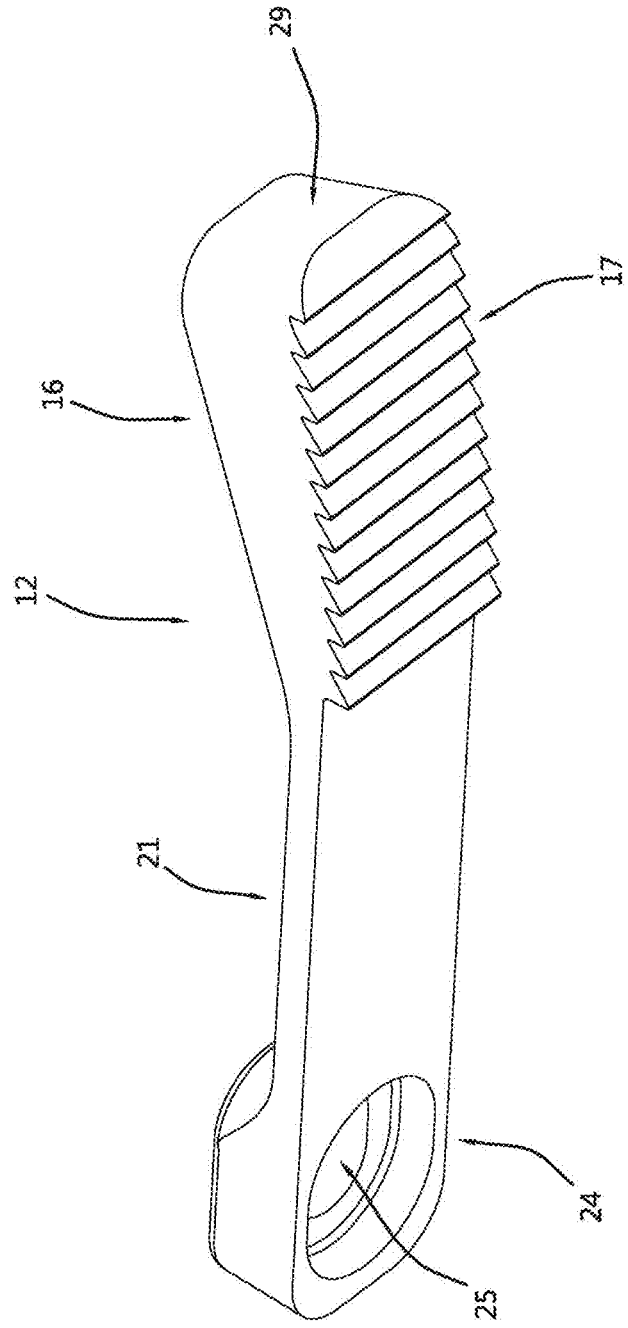
Figure 3C:
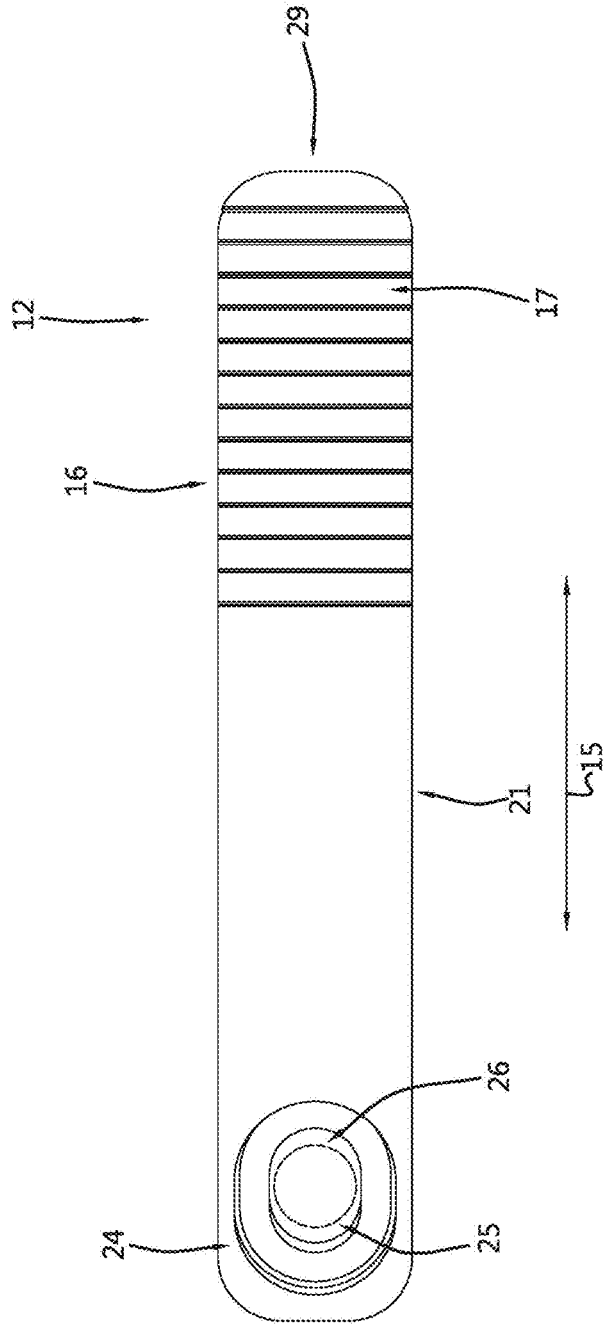
Figure 3D:
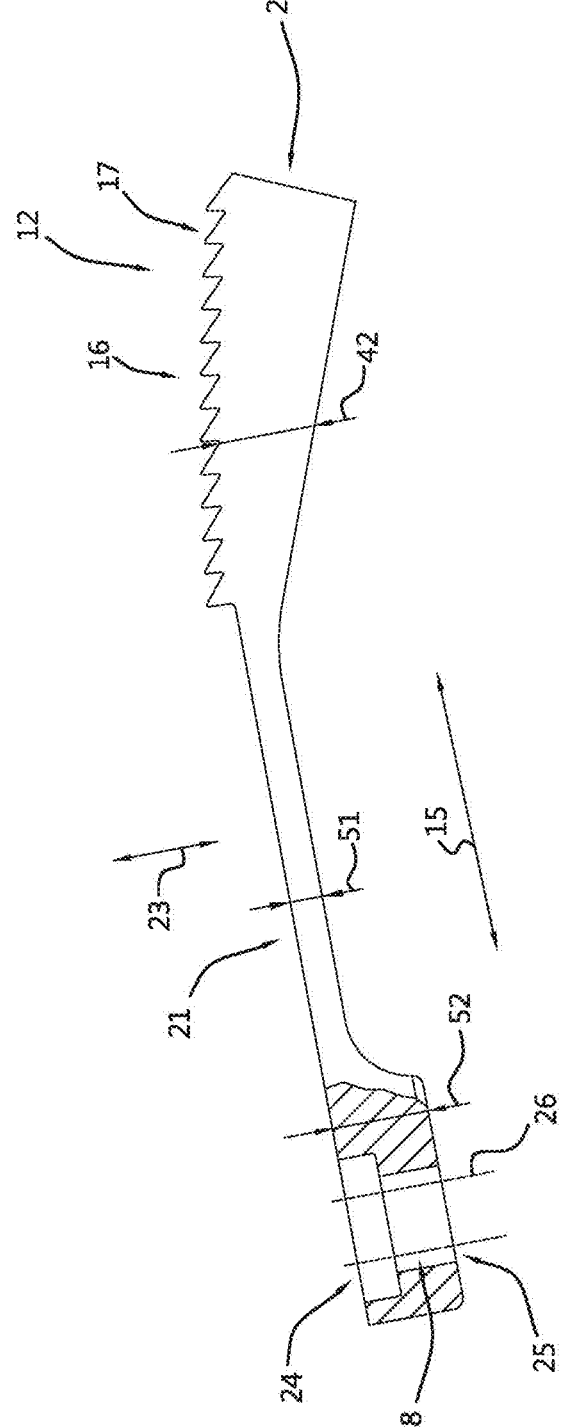
Figure 3E:
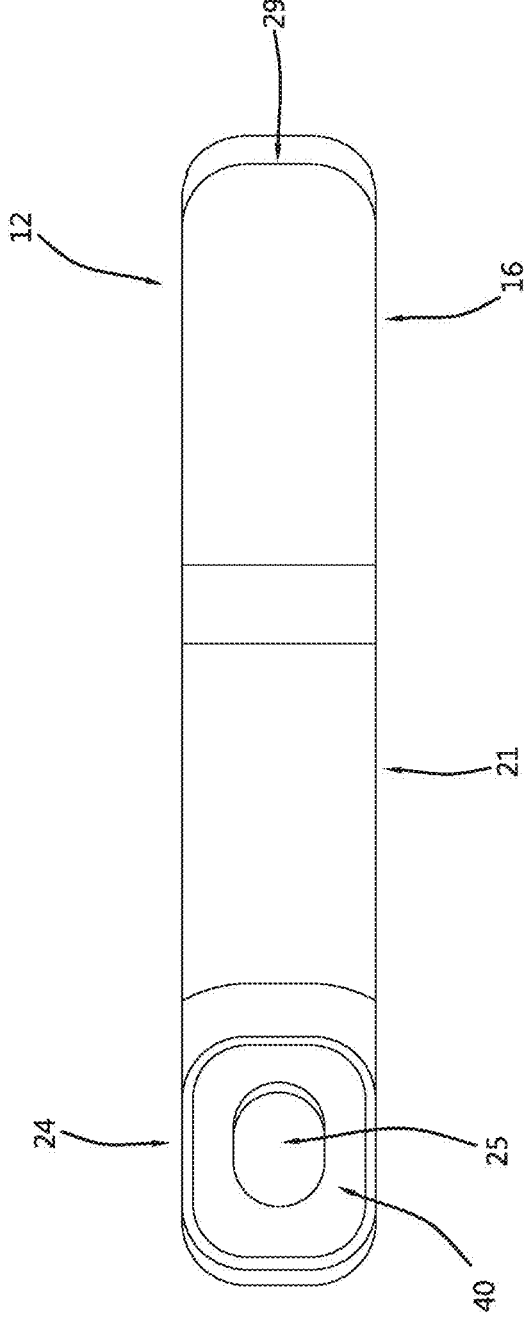
Figure 4A:
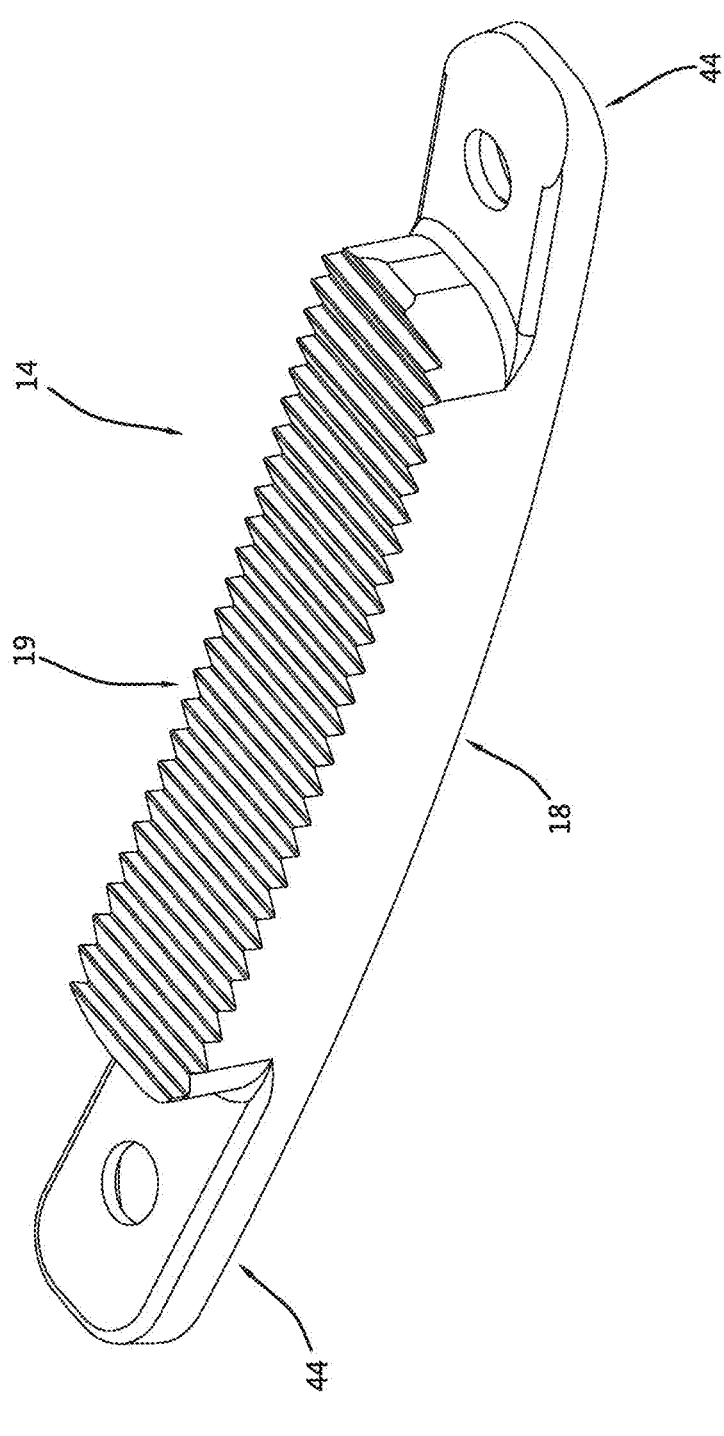
Figure 4B:
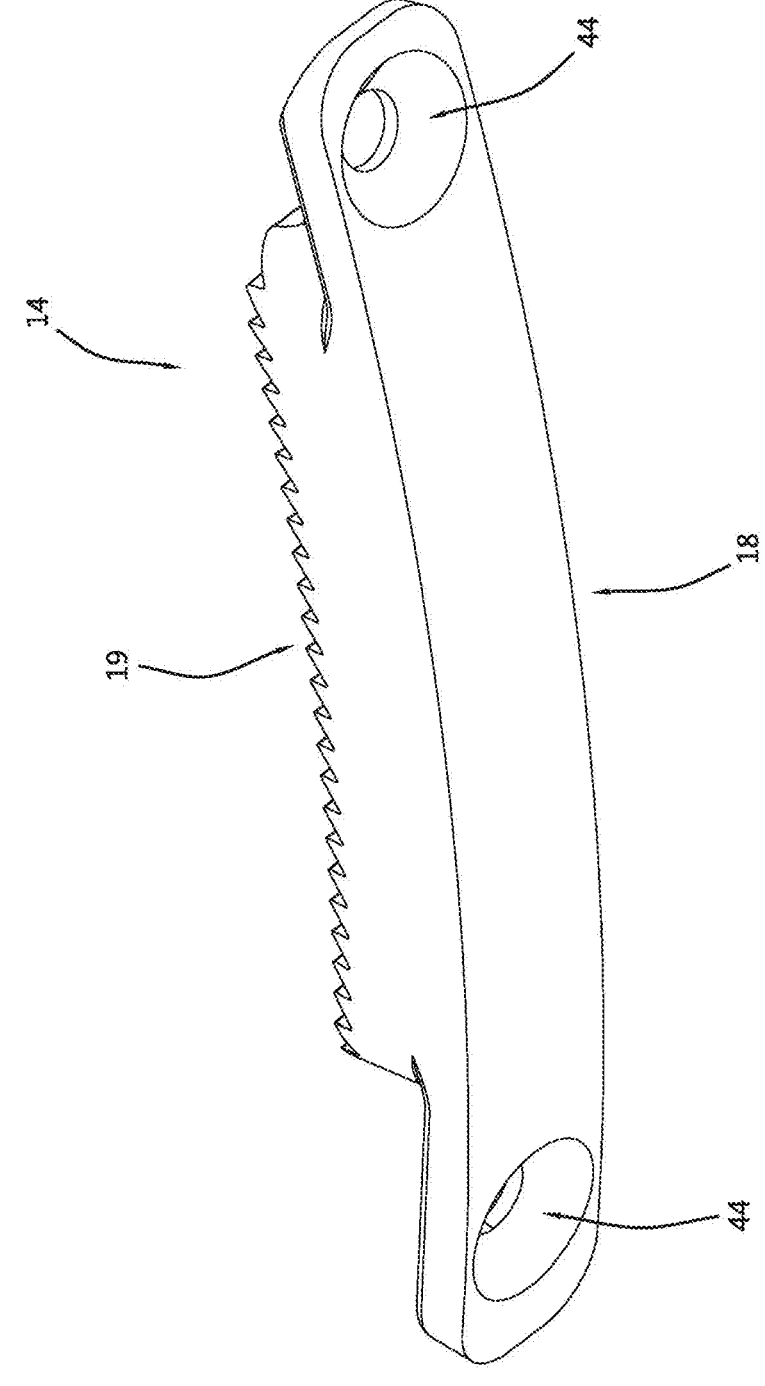
Figure 4C:
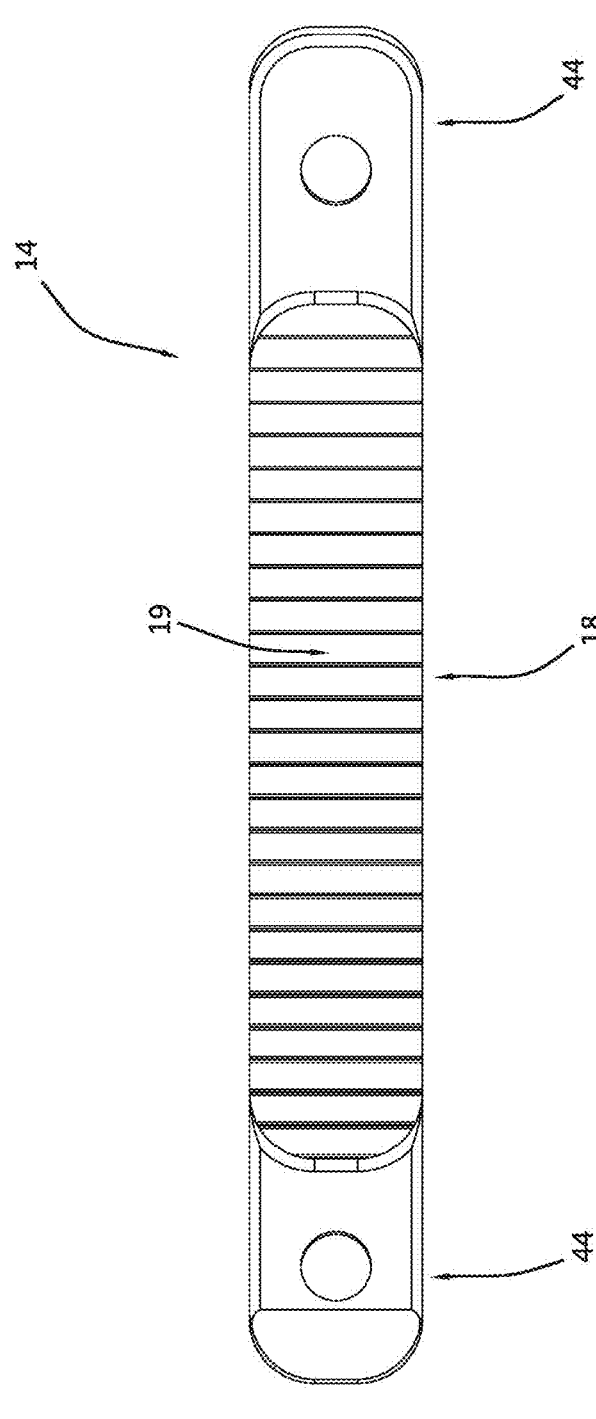
Figure 4E:
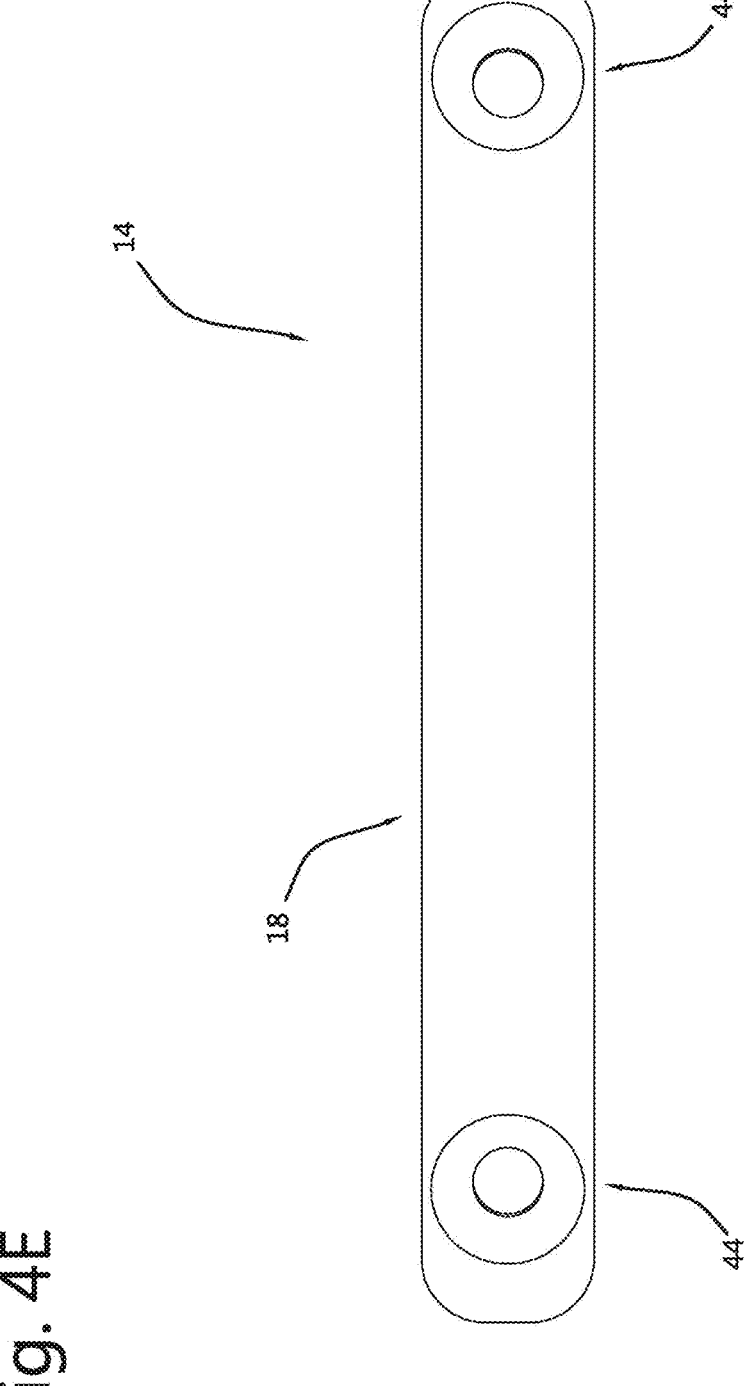

FIG. 1 shows a view in perspective of an embodiment of the threaded connection 1 according to the invention at the start of rotational make-up of the threaded connection 1. FIG. 2 shows the threaded connection 1 of FIG. 1 at final make-up 20 of the threaded connection 1.

The threaded connection 1 is configured for exploration and production of a hydrocarbon well. The threaded connection 1 comprises a pin 2 comprising an outer pin surface 3 provided with an external thread 4, a box 5 comprising an inner box surface 6 provided with an internal thread 7 for mating with the external thread 4 during rotational make-up of the threaded connection 1. The pin 2 and the box 5 extend along a longitudinal axis 11. Said longitudinal axis 11 is aligned with the axially extending central axis of the tubular members that comprise the box 5 and the pin 2.

An anti-rotation device 8 is provided to allow relative rotation between the pin 2 and the box 5 in a make-up rotation direction 9 and prevent relative rotation between the pin 2 and the box 5 in an opposite break-out rotation direction 10. The relative rotation between the pin 2 and the box 5 in the make-up rotation direction 9 is induced by applying a make-up torque 34 to the pin 2 and the box 5 in the make-up rotation direction 9. The relative rotation between the pin 2 and the box 5 in the break-out rotation direction 10 (which is prevented by the anti-rotation device 8) is induced by applying a break-out torque 35 to the pin 2 and the box 5 in the break-out rotation direction 10.

FIG. 1 shows the situation in which the box 5 is static and the pin 2 is rotated in the make-up rotation direction 9 as a result of a make-up torque 34 applied to the pin 2. FIG. 2 shows the situation in which the box 5 is static and a break-out torque 35 is applied to the pin 2. Rotation of the pin 2 in the break-out rotation direction 10 is prevented by the anti-rotation device 8.

Figure 12:
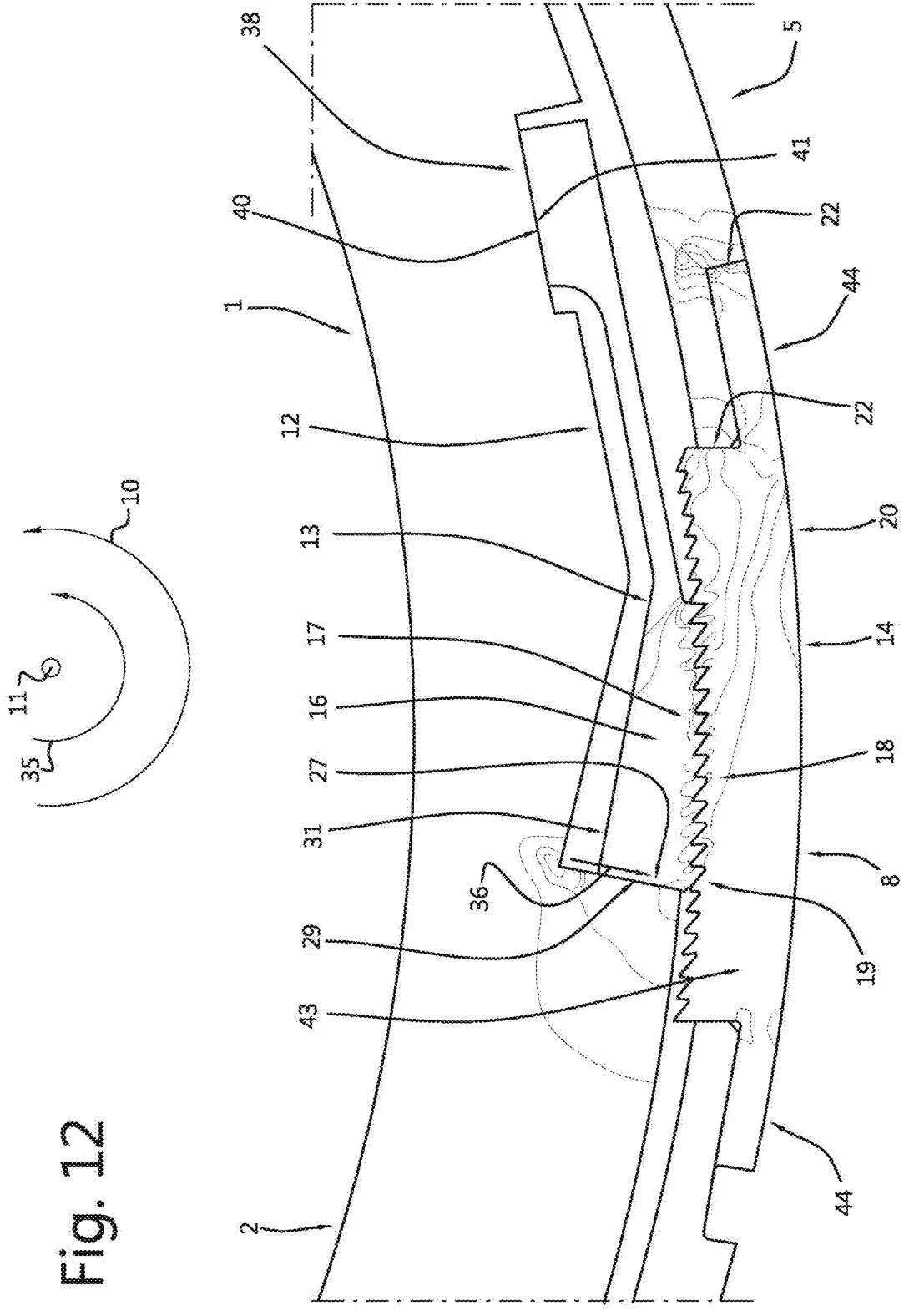
Figure 13A:
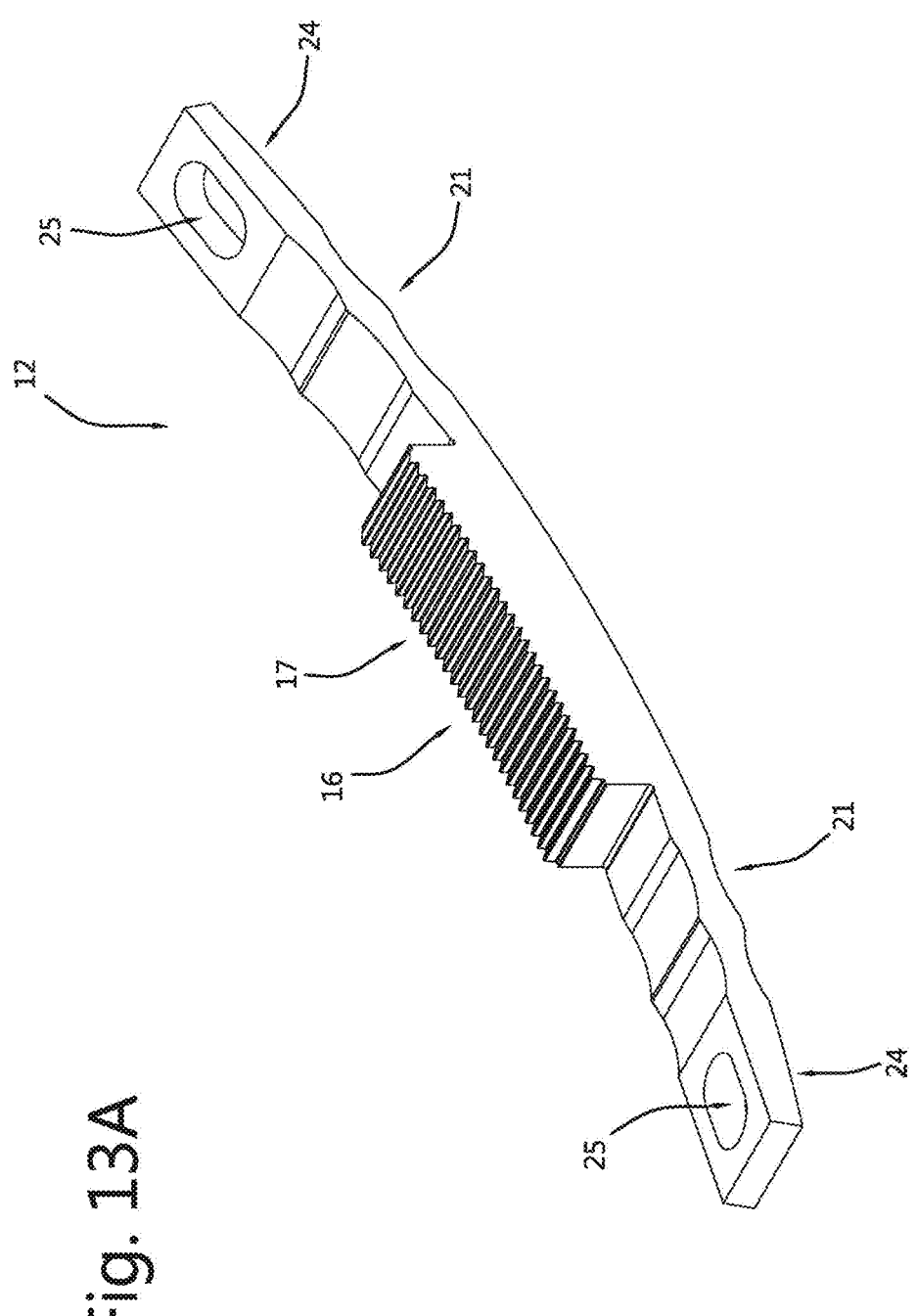
Figure 13B:
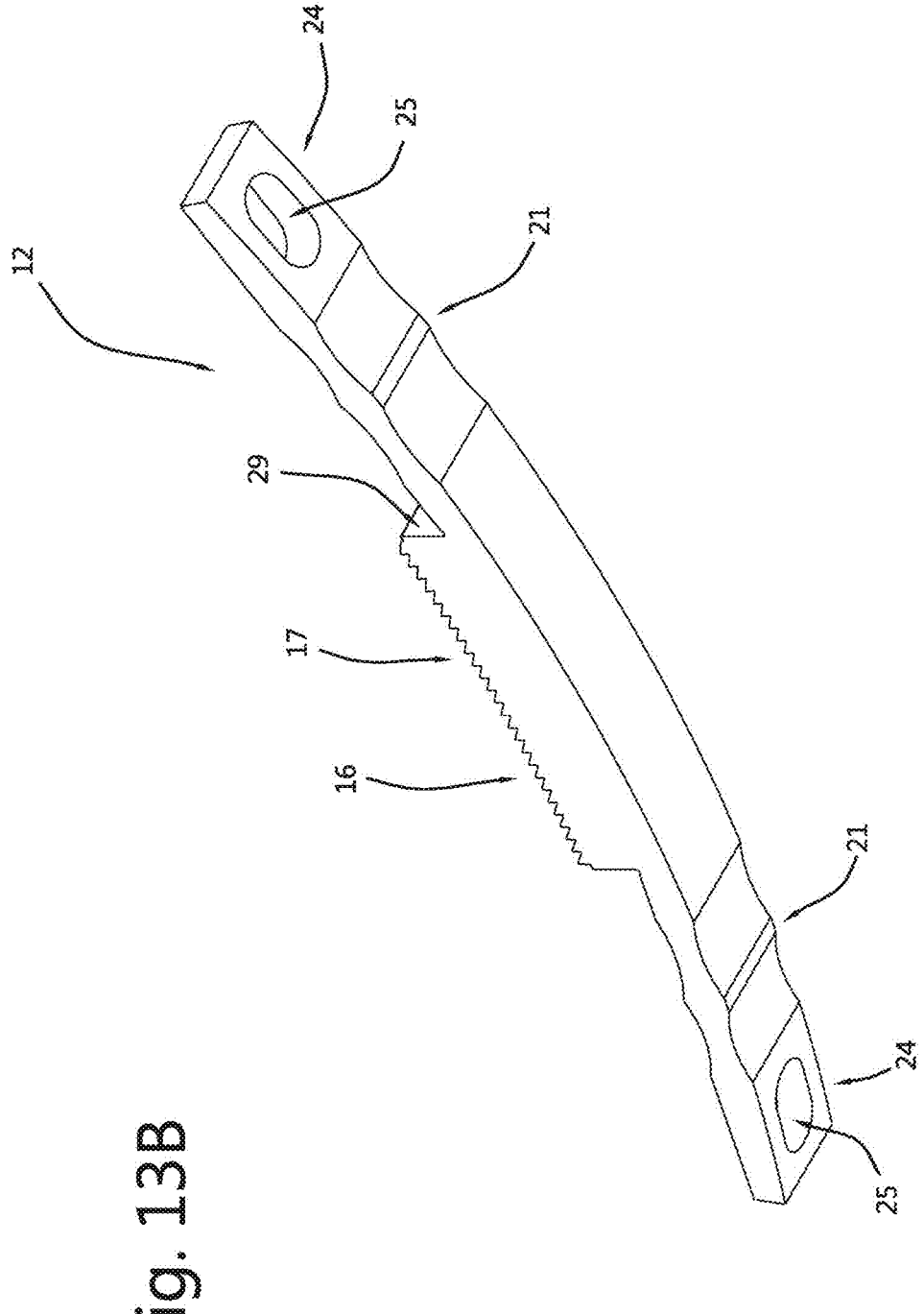
Figure 13C:
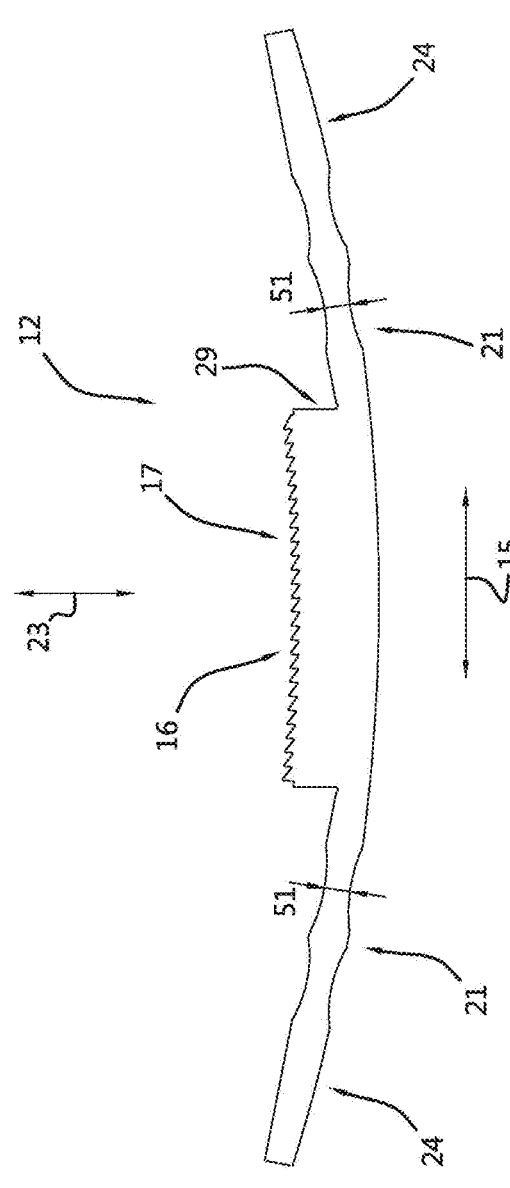

The FIGS. 11A-11G show views in cross section of part of the threaded connection 1 of FIG. 1 wherein the anti-rotation device 8 is activated by rotational make-up of the threaded connection 1 until final make-up 20 is reached. FIG. 12 shows a view in cross section of part of threaded connection 1 of FIG. 1 at final make-up 20 and indicating a finite element analysis in the situation that a break-out torque 35 is applied to the pin 2 and the box 5 in the break-out rotation direction 10. The first ratchet teeth 17 and the second ratchet teeth 19 extend in opposite radial directions 23 relative to the longitudinal axis 11 when engaging each other at final make-up 20 of the threaded. Relative rotation between the pin 2 and the box 5 in the break-out rotation direction 10 is in FIG. 12 prevented by the anti-rotation device 8.

The anti-rotation device 8 comprises a releasable mounted first anti-rotation member 12 which is arranged in a first radial recess 13 provided in the outer pin surface 3 of the pin 2, and a second anti-rotation member 14 provided at the inner box surface 6 of the box 5. In another embodiment of threaded connection 1 according to the invention, the first anti-rotation member 12 is arranged in a first radial recess 13 provided in the inner box surface 6 of the box 5, and the second anti-rotation member 14 is provided at the outer pin surface 3 of the pin 2.

The anti-rotation device 8 comprises multiple first anti-rotation members 12 and multiple second anti-rotation members 14. The location of the first anti-rotation members 12 and the second anti-rotation members 14 are in the FIGS. 1 and 2 indicated by the arrows A and B, respectively.

The first anti-rotation member 12 comprises a first ratchet part 16 provided with radially extending first ratchet teeth 17. The second anti-rotation member 14 comprises a second ratchet part 18 provided with radially extending second ratchet teeth 19 which engage the first ratchet teeth 17 of the first anti-rotation member 12 at final make-up 20 of the threaded connection 1. In particular, the first ratchet teeth 17 and the second ratchet teeth 19 are of the saw-tooth type, wherein the first ratchet teeth 17 and the second ratchet teeth 19 are arranged to allow rotation of the pin 2 with respect to the box 5 in the make-up rotation direction 9 and limit rotation of the pin 2 with respect to the box 5 in the break-up rotation direction 10. Even more in particular, the saw-teeth of the first and second ratchet teeth 17, 19 are (slightly) negatively inclined. The first anti-rotation member 12 comprises a spring part 21 which allows radial movement of the first ratchet part 16 in radial direction 23 relative to the longitudinal axis 11 when first ratchet teeth 17 slide along second ratchet teeth 19 during relative rotation between the pin 2 and the box 5 in the make-up rotation direction 9. The radial movement relative to the longitudinal axis 11 of the first ratchet part 16 moves the first ratchet teeth 17 radially relative to the second ratchet teeth 19.

The first ratchet part 16 and the spring part 21 of the first anti-rotation member 12 are integrally formed. By providing a threaded connection 1 for exploration and production of a hydrocarbon well, wherein said first ratchet part 16 and said spring part 21 of said first anti-rotation member 12 are integrally formed, a relatively robust anti-rotation device 8 may be provided. As said first ratchet part 16 and said spring part 21 are formed from a single piece of material, a homogeneous anti-rotation member is provided. Such homogeneous anti-rotation member may provide a strong material connection between said first ratchet part 16 and said spring part 21. Accordingly, said device may be less susceptible to damage, and thus a relatively robust anti-rotation device 8 can be provided.

The second ratchet part 18 is longer than the first ratchet part 16. The teeth 19 of the second ratchet part 18 extend over a longer length than the teeth 17 of the first ratchet part 16. In particular, the second ratchet part 18 has more teeth 19 than the first ratchet part 16.

As the first ratchet part 16 and the spring part 21 are formed from a single piece of material, the first anti-rotation member 12 may be free from connection components, e.g. a screw, connecting the first ratchet part 16 with the spring part 21. The invention is amongst others based on the obtained insight that such connection components may be particularly susceptible to material deformations caused by shear stresses, in particular when the first anti-rotation member 12 is subjected to a relatively large break-out torque 35 in the break-out direction. By omitting the presence of such connection components, damage to these connection components may be prevented.

The FIGS. 3A-3E show views of the first anti-rotation member 12 of the anti-rotation device 8 of the threaded connection 1 of FIG. 1. The first anti-rotation member 12 comprises a first mounting part 24 to releasable mount the first anti-rotation member 12 in the first radial recess 13. The first anti-rotation member further comprises the first ratchet part 16, and the spring part 21. The first mounting part 24, the first ratchet part 16, and the spring part 21 of the first anti-rotation member 12 are integrally formed. The first radial recess 13 extends along part of a pin circumference 47 of the outer pin surface 3 of the pin 2.

The first ratchet part 16 is wedge shaped. In particular, the first ratchet part 16 has a substantially wedge shaped cross section. Said wedge shape has a relatively broad base that forms the first member contact surface 29 and converges towards the spring part 21 of the first anti-rotation member 12. At an outer surface of the first ratchet part 16 the first ratchet teeth 17 are provided. Said first ratchet teeth 17 extend between the first member contact surface 29 and the spring part 21. The first ratchet teeth 17 have a saw-tooth profile.

The first member contact surface 29 is provided adjacent the first ratchet teeth 17. Said first member surface 29 extends under an angle of between 45-80 degrees with respect to a plane defined by said first ratchet teeth 17.

The spring part 21 is located between the first ratchet part 16 and the first mounting part 24. Said spring 21 part is formed as an elongated plate. Said spring part 21 has a relatively small thickness in comparison with the first ratchet part 16 and the first mounting part 24. Accordingly, said spring part 21 has a lower stiffness than the first ratchet part 16 and the first mounting part 24.

The first mounting part 24 is located further away from the first ratchet part 16 than the spring part 21. Said first mounting part 24 comprises an elongated first mounting through hole 25 and has a radial first mounting thickness 52 that is greater than a radial first spring thickness 51 of the spring part 21. As such, said first mounting part 24 has a relatively high stiffness in comparison with the spring part 21.

Figure 5:
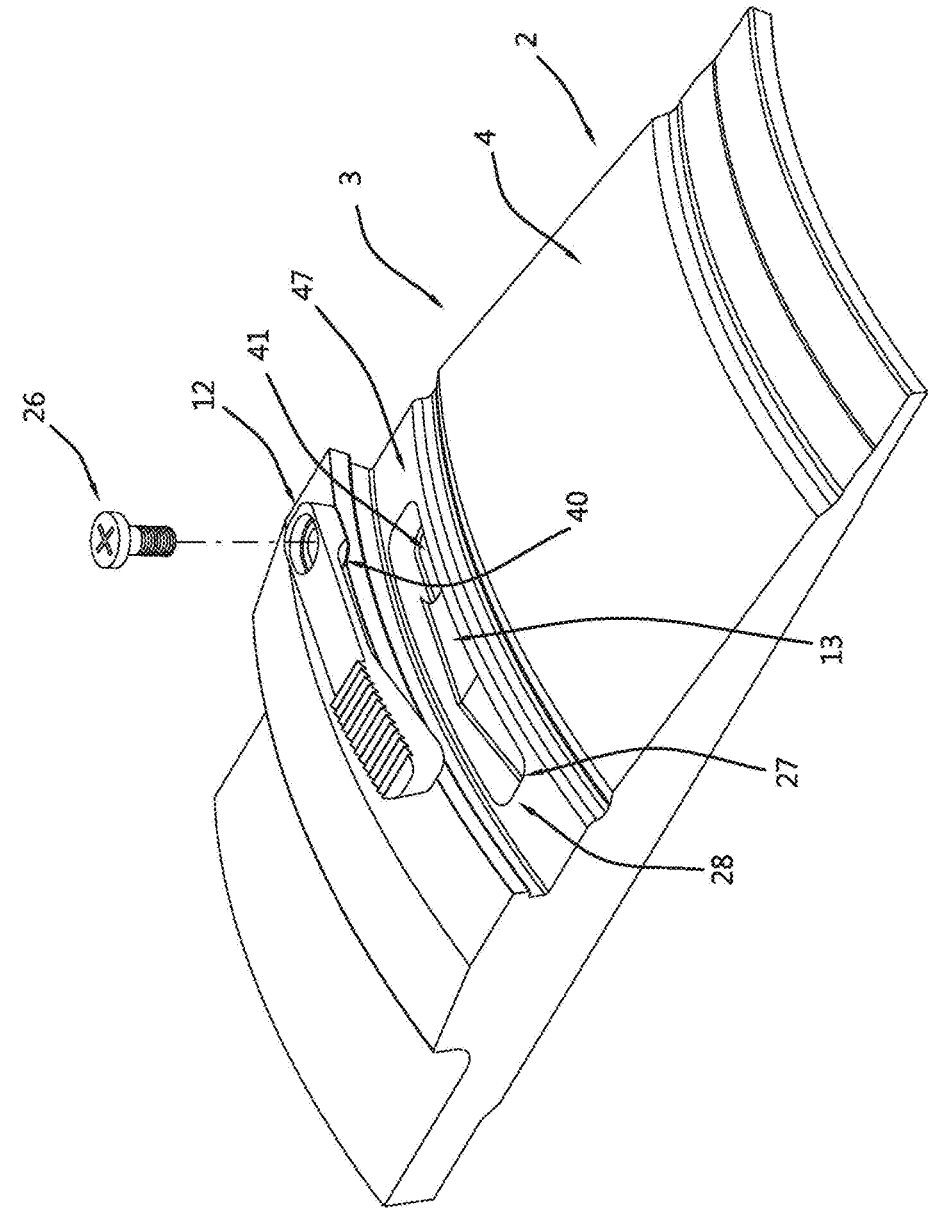
Figure 6A:
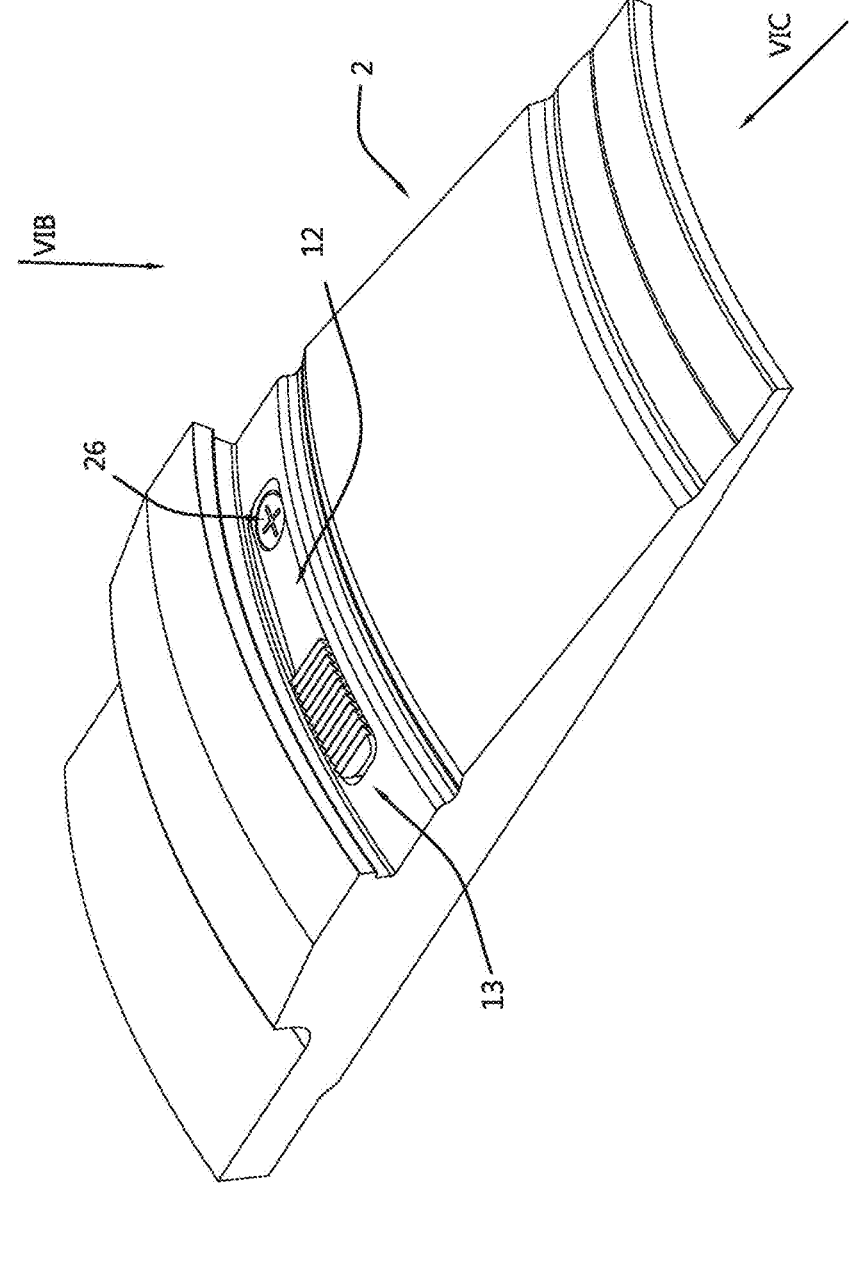
Figure 6B:
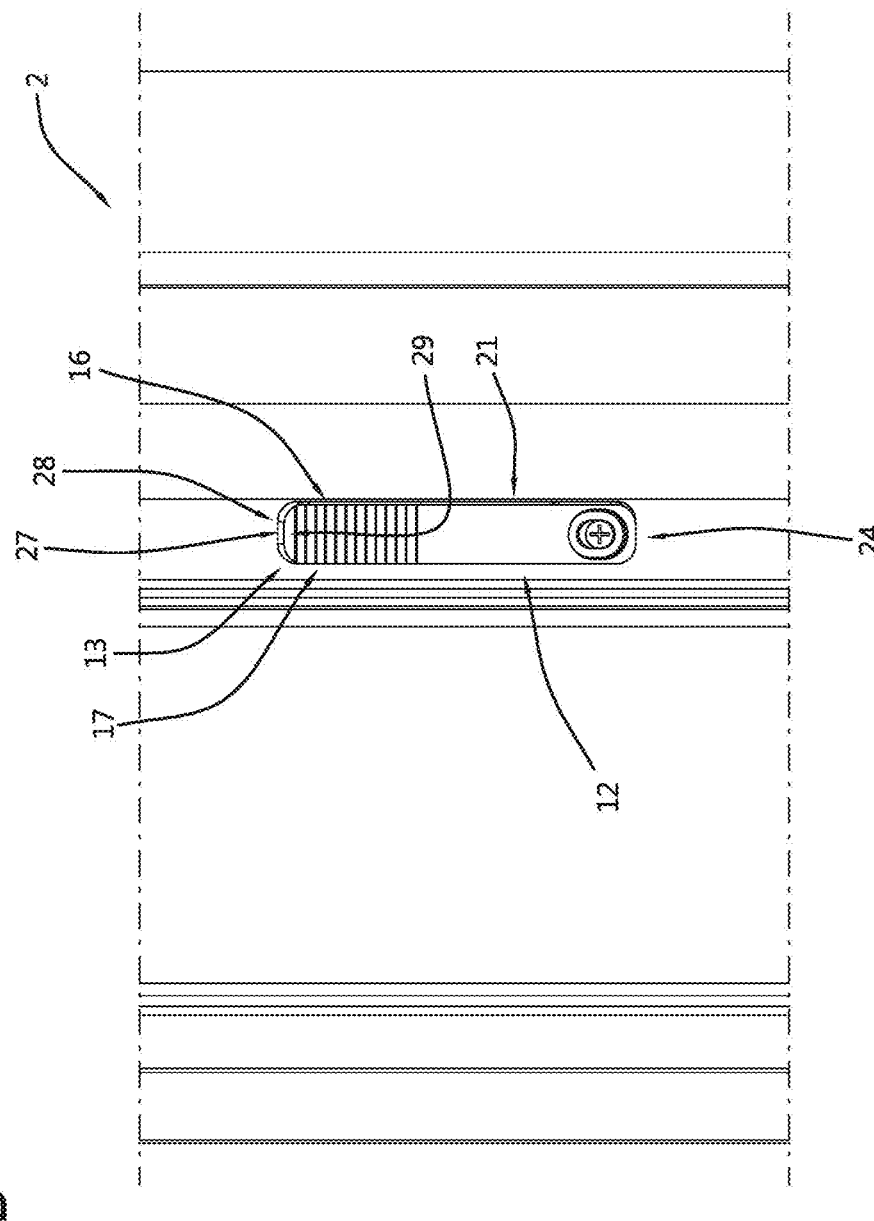
Figure 6C:
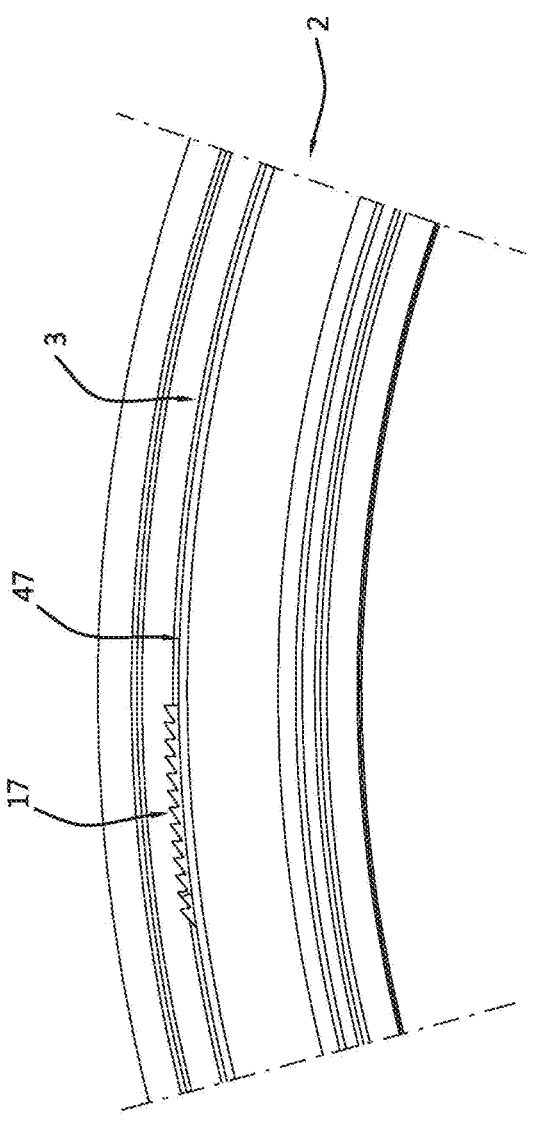
Figure 7:
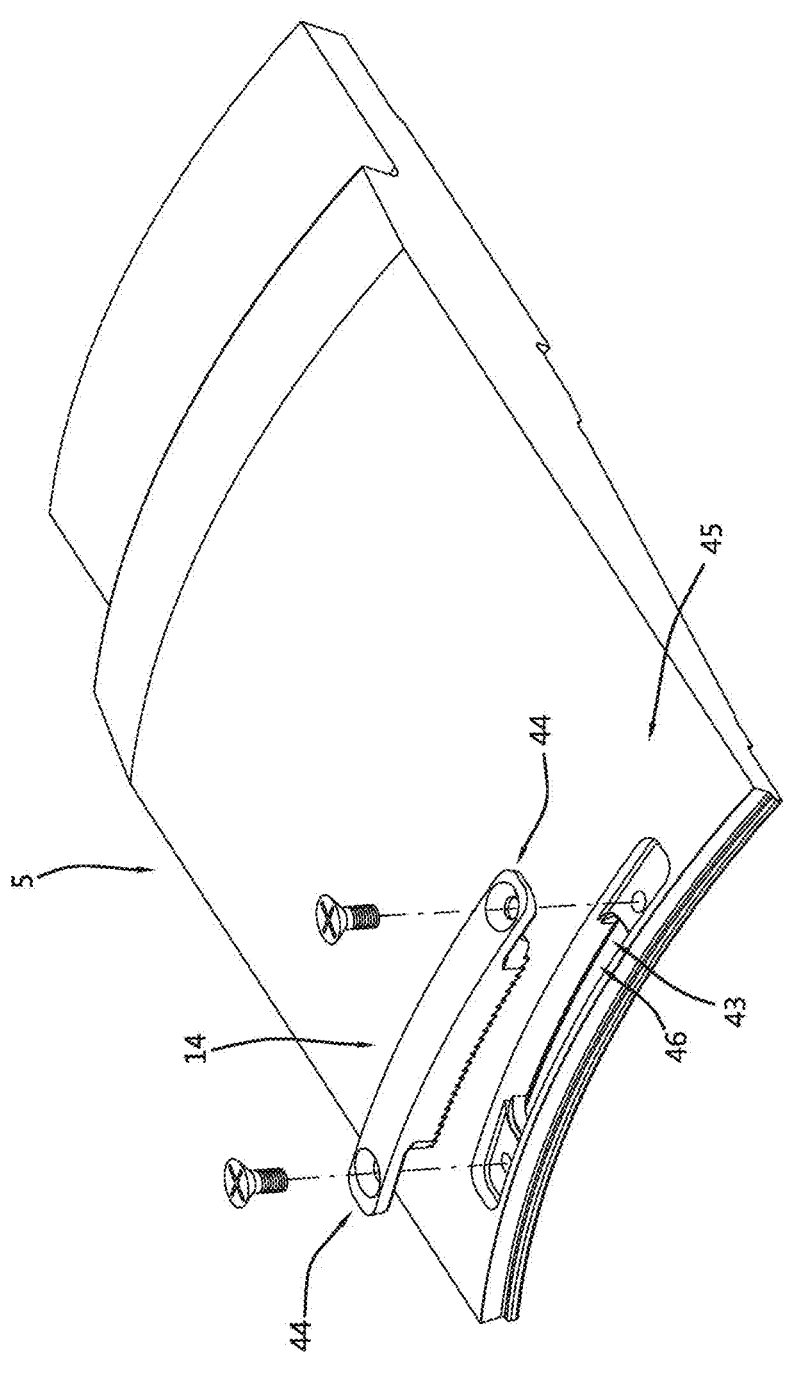
Figure 8:
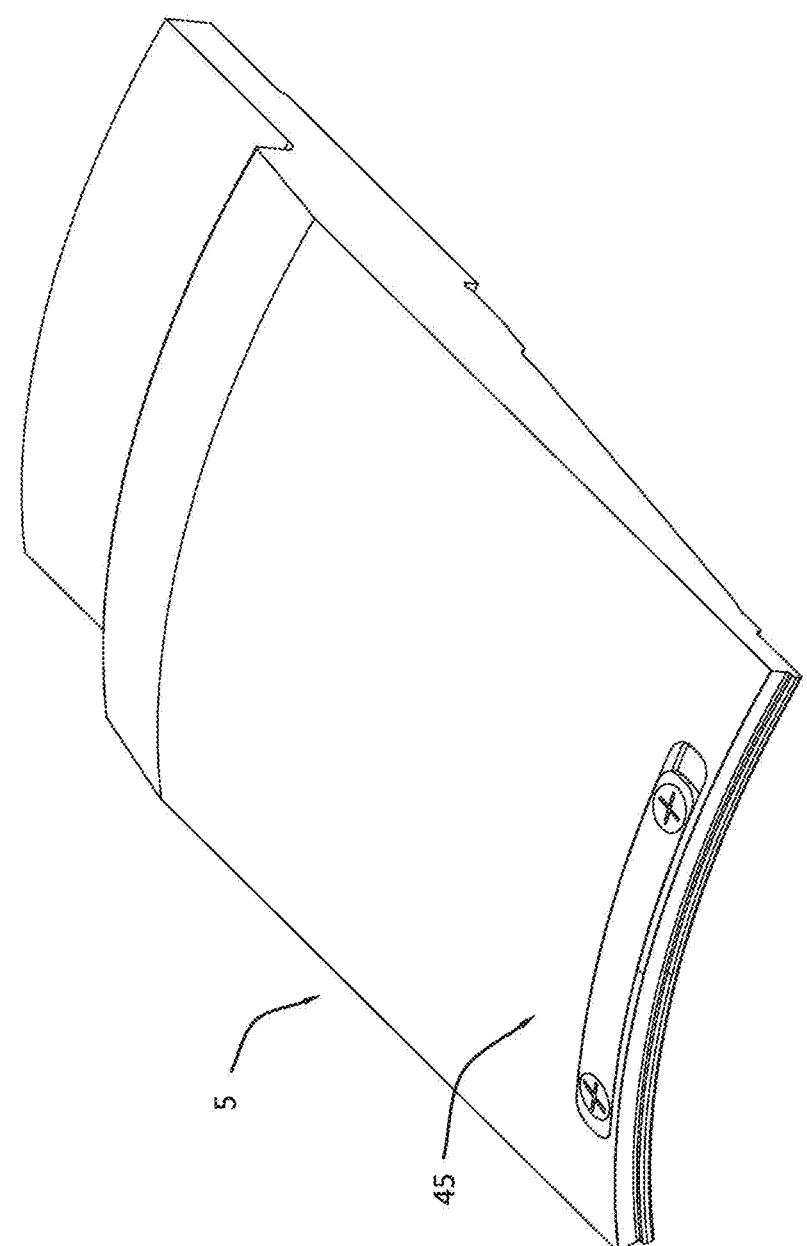

FIG. 5 shows an exploded view of the first anti-rotation member 12 and the first radial recess 13 provided in the pin 2 of the threaded connection 1 of FIG. 1 and the FIGS. 6A-C show views of the first anti-rotation member 12 arranged in the first radial recess 13. The first mounting part 24 comprises a first mounting through hole 25 to receive a first mounting member 26, such as a first screw, which releasable mounts the first anti-rotation member 12 to the pin 2.

A first recess contact surface 27 of the pin 2 defines a first recess boundary 28 of the first radial recess 13. The first anti-rotation member 12 comprises a first member contact surface 29 facing the first recess contact surface 27. The first mounting part 24 is configured to allow tangential movement in a tangential direction 15 relative to the longitudinal axis 11 of the first anti-rotation member 12 in the first radial recess 13 from a first tangential member position 31 wherein the first member contact surface 29 of the first anti-rotation member 12 is in contact with the first recess contact surface 27 into a second tangential member position 32 wherein the first member contact surface 29 of the first anti-rotation member 12 is located at a first tangential member distance 33 from the first recess contact surface 27, and vice versa. This is also shown in the FIGS. 11A-G and 12.

This has the advantage that the anti-rotation device 8 may be even less susceptible to damage. As the first mounting part 24 is configured to allow tangential movement (e.g. to allow sliding movement) of the first anti-rotation member 12 from said first tangential member position 31 to said second tangential member position 32, and said first recess contact surface 27 and said first member contact surface 29 direct forces as a result of a break-out torque 35 applied to the pin 2 and the box 5 in the break-out rotation direction 10 mainly through the teeth of the first ratchet part 16 and the second ratchet part 18, stresses in the material may be directed away from said first mounting part 24 (and a first mounting member 26, e.g. a screw, provided in said first mounting part 24) wherein there are relatively few stresses present at said first mounting part 24. As such, said first mounting part 24 may be substantially free from (shear) stresses. In particular, said anti-rotation device 8 may be configured to allow said first recess contact surface 27 and said first member contact surface 29 to abut while said teeth limit rotation of the pin 2 with respect to the box 5 in the break-out direction. As such, relatively few connection parts (e.g. said first mounting part 24) may be subjected to stresses under the influence of a break-out torque 35.

The tangential movement in tangential direction 15 does not need to be restricted to movement only in tangential direction 15 relative to the longitudinal axis 11. It may have a certain degree of movement in other directions relative to the longitudinal axis 11, for example to create a movement partly around the longitudinal axis 11.

The first recess contact surface 27 and the first member contact surface 29 are configured to distribute forces as a result of a break-out torque 35 applied to the pin 2 and the box 5 in the break-out rotation direction 10 mainly through the teeth of the first ratchet part 16 and the second ratchet part 18.

The second anti-rotation member 14 is configured to push the first anti-rotation member 12 into the second tangential member position 32 when a predetermined make-up torque 34 is applied to the pin 2 and the box 5 in the make-up rotation direction 9, and into the first tangential member position 31 when a predetermined break-out torque 35 is applied to the pin 2 and the box 5 in the break-out rotation direction 10. Second ratchet teeth 19 which engage first ratchet teeth 17 push the first anti-rotation member 12 into the second tangential member position 32 when the predetermined make-up torque 34 is applied, and into the first tangential member position 31 when the predetermined break-out torque 35 is applied.

The first recess contact surface 27 and the first member contact surface 29 are configured to create a radial counter force 36 acting against radial movement of the first ratchet part 16 in radial direction 23 relative to the longitudinal axis 11 when the first anti-rotation member 12 is located in the first tangential member position 31 and a break-out torque 35 is applied to the pin 2 and the box 5 in the break-out rotation direction 10. The radial counter force 36 is formed by a friction force between the first recess contact surface 27 and the first member contact surface 29 when the break-out torque 35 is applied to the pin 2 and the box 5 in the break-out rotation direction 10. See amongst others FIG. 12.

The first mounting through hole 25 is in tangential direction relative to the longitudinal axis 11 larger than a first mounting portion 38 of the first mounting member 26 being surrounded by the first mounting through hole 25 to allow movement of the first anti-rotation member 12 in tangential direction and relative to the first mounting member 26. The first mounting through hole 25 has an elongate form 39 in tangential direction relative to the longitudinal axis 11. In another embodiment of the threaded connection 1 according to the invention the first mounting through hole 25 has a circular form.

The first recess contact surface 27 and the first member contact surface 29 are configured to block tangential movement of the first anti-rotation member 12 beyond the first tangential member position 31 when a break-out torque 35 is applied to the pin 2 and the box 5 in the break-out rotation direction 10.

The first mounting through hole 25 is dimensioned to avoid forces in tangential direction working on the first mounting member 26 by the first anti-rotation member 12 being located in the first tangential member position 31 when a break-out torque 35 is applied to the pin 2 and the box 5 in the break-out rotation direction 10. This is amongst others shown in FIG. 12.

The first tangential member distance 33 allows radial movement of the first ratchet part 16 in radial direction 23 relative to the longitudinal axis 11 when first ratchet teeth 17 slide along second ratchet teeth 19 during relative rotation between the pin 2 and the box 5 in the make-up rotation direction 9.

The first mounting part 24 comprises a first mounting slide surface 40 surrounding the first mounting through hole

25 and being in contact with a corresponding first recess slide surface 41 provided at the first radial recess 13 to facilitate the tangential movement of the first anti-rotation member 12 from the first tangential member position 31 into the second tangential member position, and vice versa. In particular, the first recess slide surface 41 is larger, in tangential direction 15, than the first mounting slide surface 40.

The spring part 21 of the first anti-rotation member 12 is in tangential direction relative to the longitudinal axis 11 located between the first ratchet part 16 and the first mounting part 24. The first member contact surface 29 of the first anti-rotation member 12 is located at the first ratchet part 16 and the first ratchet teeth 17 are in tangential direction relative to the longitudinal axis 11 located between the first member contact surface 29 and the spring part 21.

A radial first ratchet thickness 42 of the first ratchet part 16 increases in tangential direction relative to the longitudinal axis 11 from the spring part 21 to the first member contact surface 29. This way, the first member contact surface 29 is increased to reduce the pressure (and therefore reduce the stresses) at the first member contact surface 29.

The first anti-rotation member 12 is only mounted to said one of the pin 2 and the box 5 in which the first radial recess 13 is provided via the first mounting part 24. The first anti-rotation member 12 comprises one, and only one, first mounting part 24. The first anti-rotation member 12 comprises one, and only one, spring part 21.

As shown in FIG. 6C, the first ratchet teeth 17 of the first anti-rotation member 12 extend in radial direction 23 beyond the pin outer surface 3.

The FIGS. 4A-4E show the second anti-rotation member 14 of the anti-rotation device 8 of the threaded connection 1 of FIG. 1. The FIGS. 7, 8, and 9A-9C shows of the second anti-rotation member 14 and the second radial recess 43 provided in the box 5 of the threaded connection 1 of FIG. 1. The second anti-rotation member 14 is releasable mounted in the second radial recess 43 being provided in the inner box surface 6 of the box 5. In another embodiment of the threaded connection 1 according to the invention, the second anti-rotation member 14 is releasable mounted in the second radial recess 43 being provided in the outer pin surface 3 of the pin 2.

The second radial recess 43 extends along part of a box 5 circumference 48 of the inner box surface 6 of the box 5.

The second ratchet part 18 of the second anti-rotation member 14 is fixed in radial direction 23 relative to the longitudinal axis 11. The second ratchet part 18 of the second anti-rotation member 14 may have some flexibility in radial direction 23 relative to the longitudinal axis 11, but should be more rigid than the first ratchet part 16. In another embodiment of the threaded connection 1 according to the invention, the second ratchet part 18 of the second anti-rotation member 14 may be more flexible in radial direction 23 relative to the longitudinal axis 11 and as rigid as (or even less rigid than) the first ratchet part 16.

The second radial recess 43 comprises a second recess through hole 46 in which the second ratchet part 18 of the second anti-rotation member 14 is located. The second anti-rotation member 14 comprises two second mounting parts 44 to releasable mount the second anti-rotation member 14 to the box 5. The two second mounting parts 44 are located at opposite sides of the second radial recess 43. The box 5 comprises an outer box surface 45 and the two second mounting parts 44 are releasable mounted to the box 5 at the outer box surface 45. In another embodiment of the threaded connection 1 according to the invention, the second anti-rotation member 14 comprises one, and only one, second mounting part 44 to releasable mount the second anti-rotation member 14 to the box 5.

Figure 10:
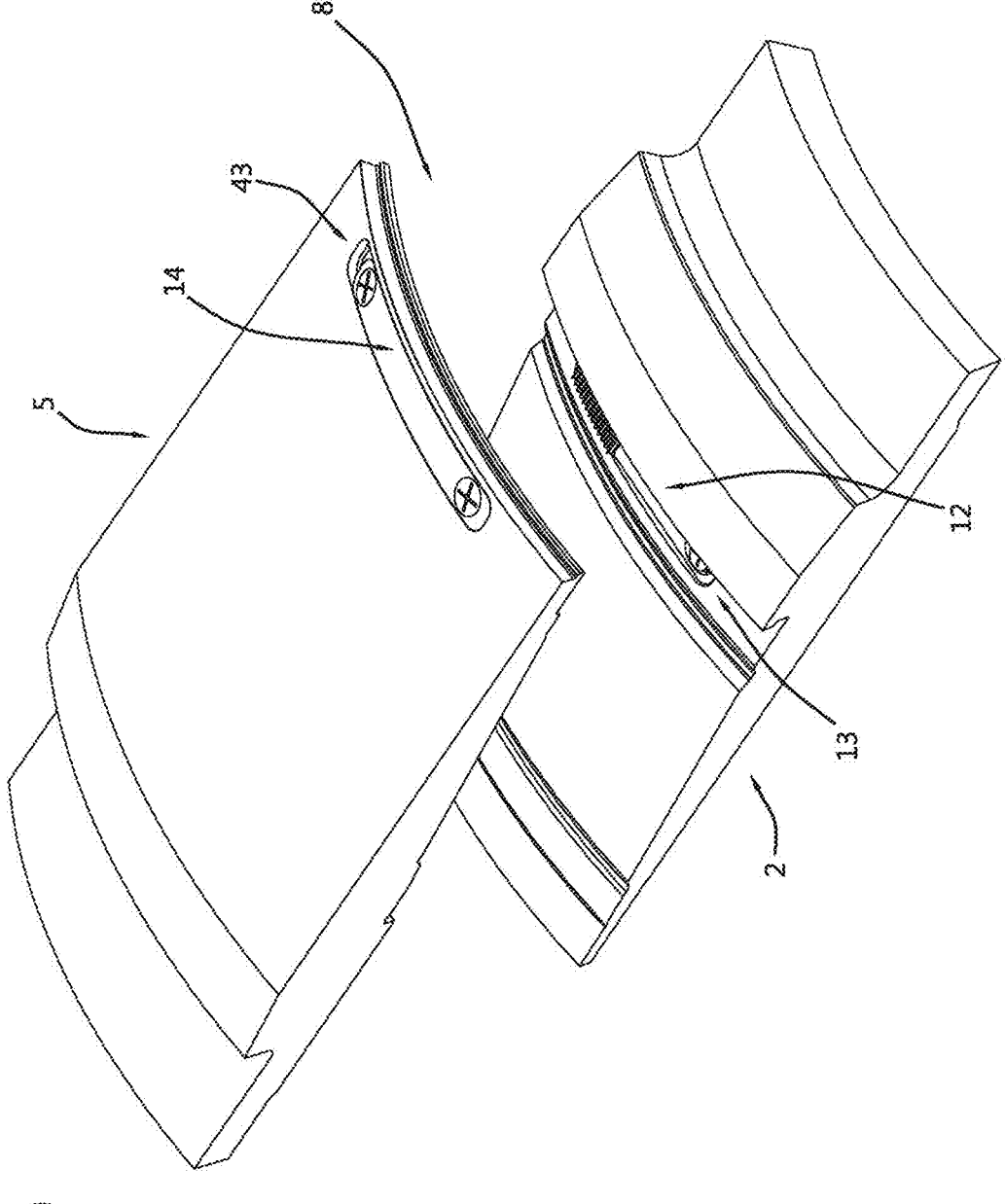
Figure 11A:
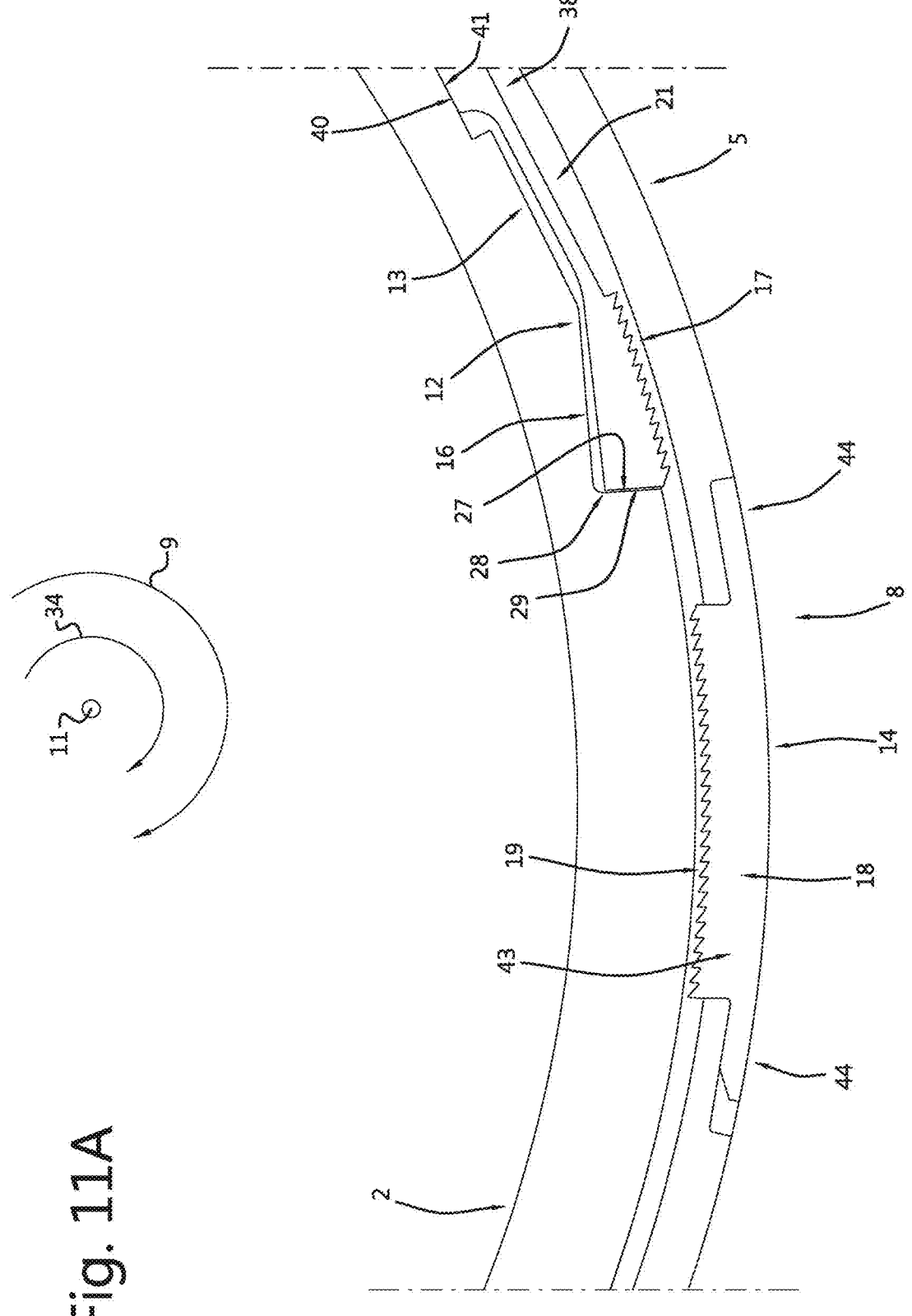
Figure 11B:
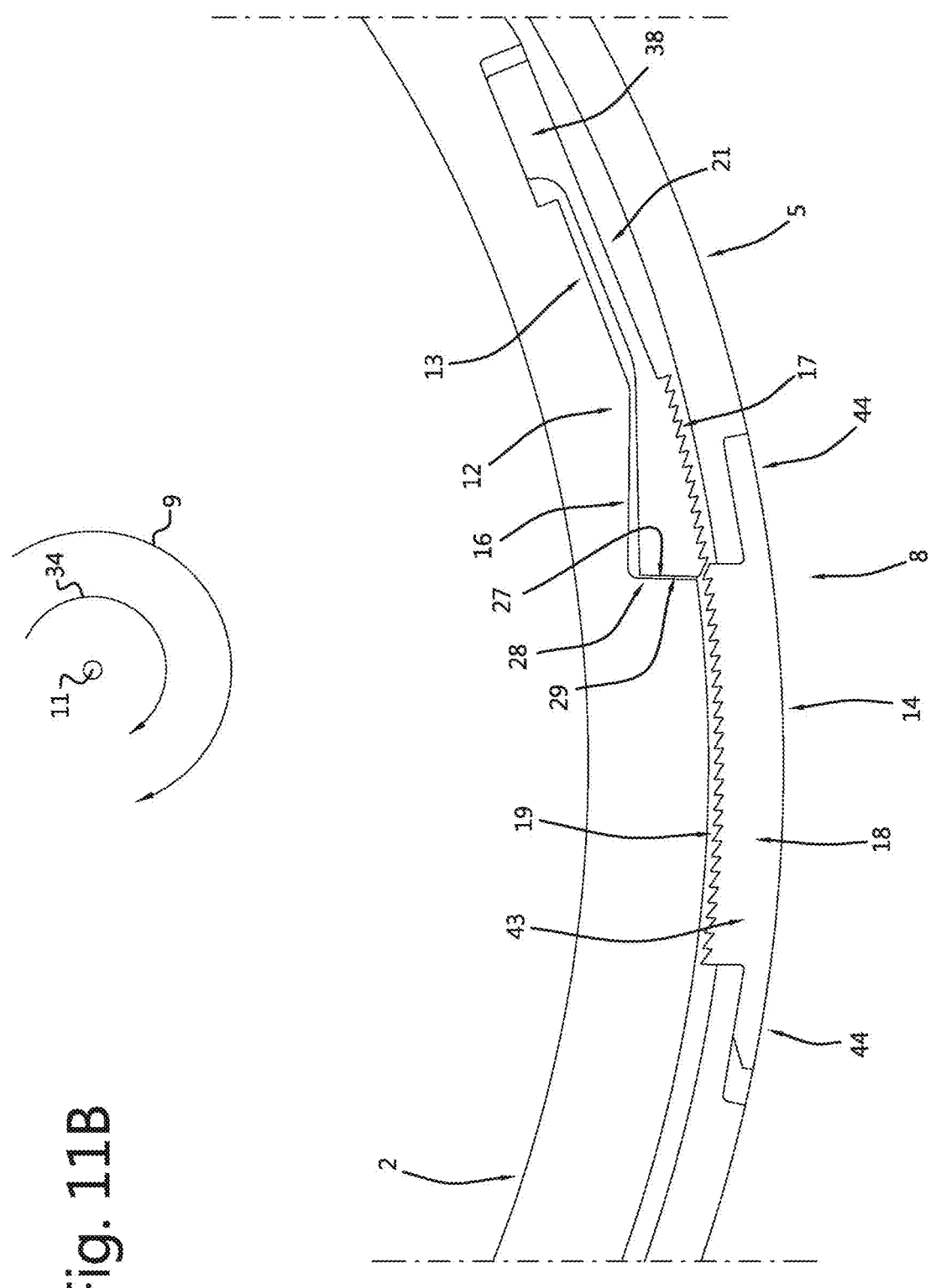
Figure 11C:
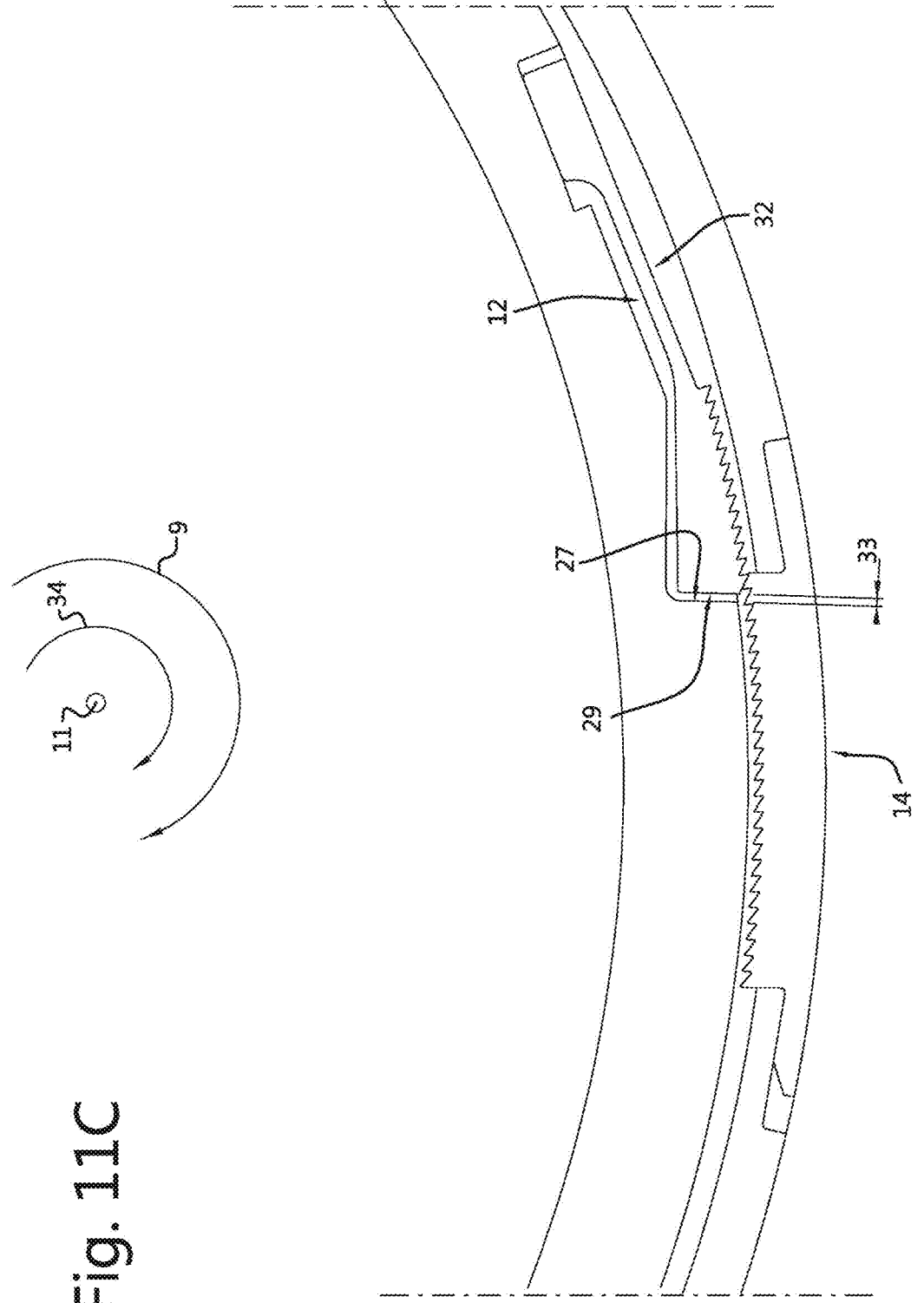
Figure 11D:
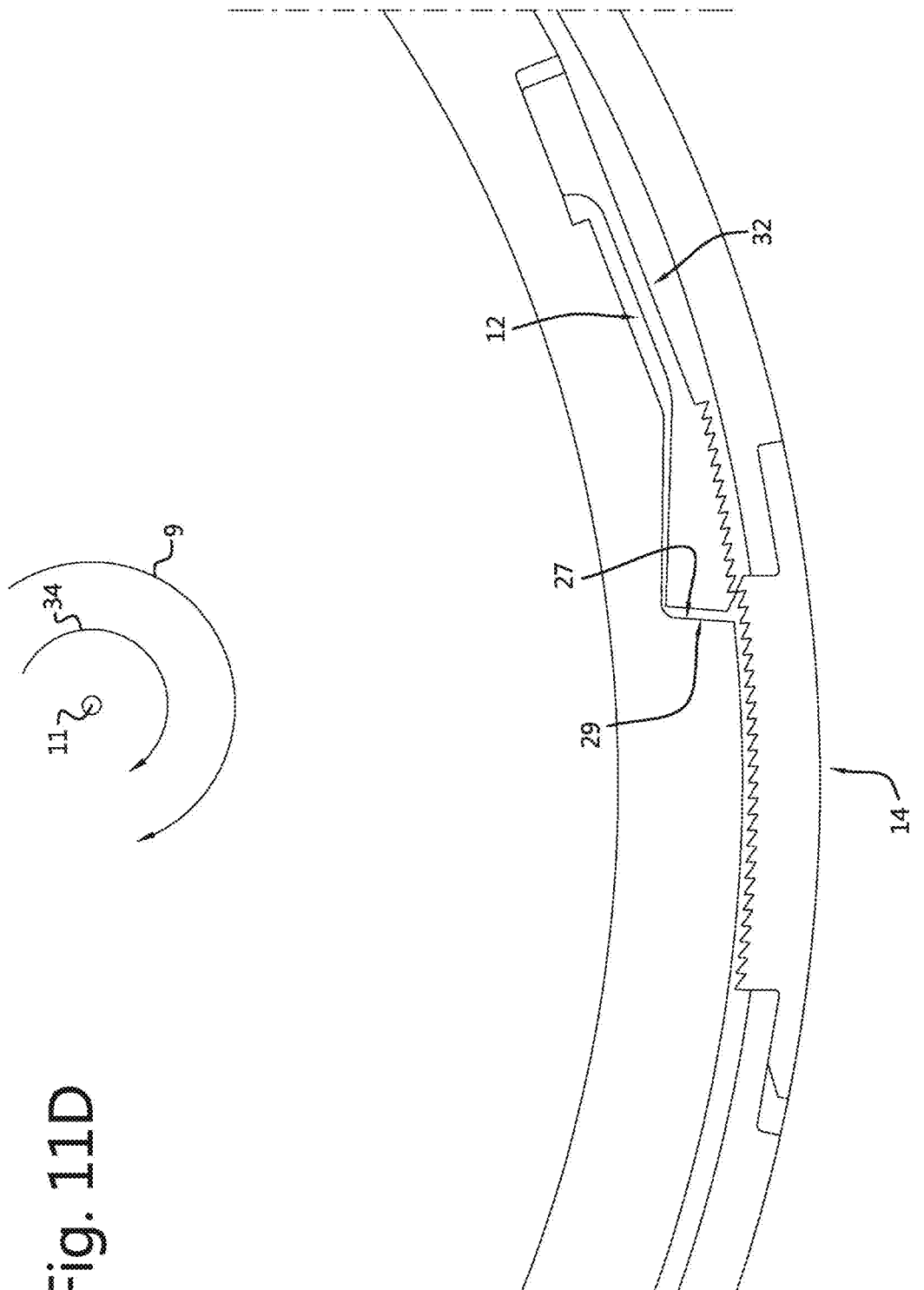
Figure 11E:
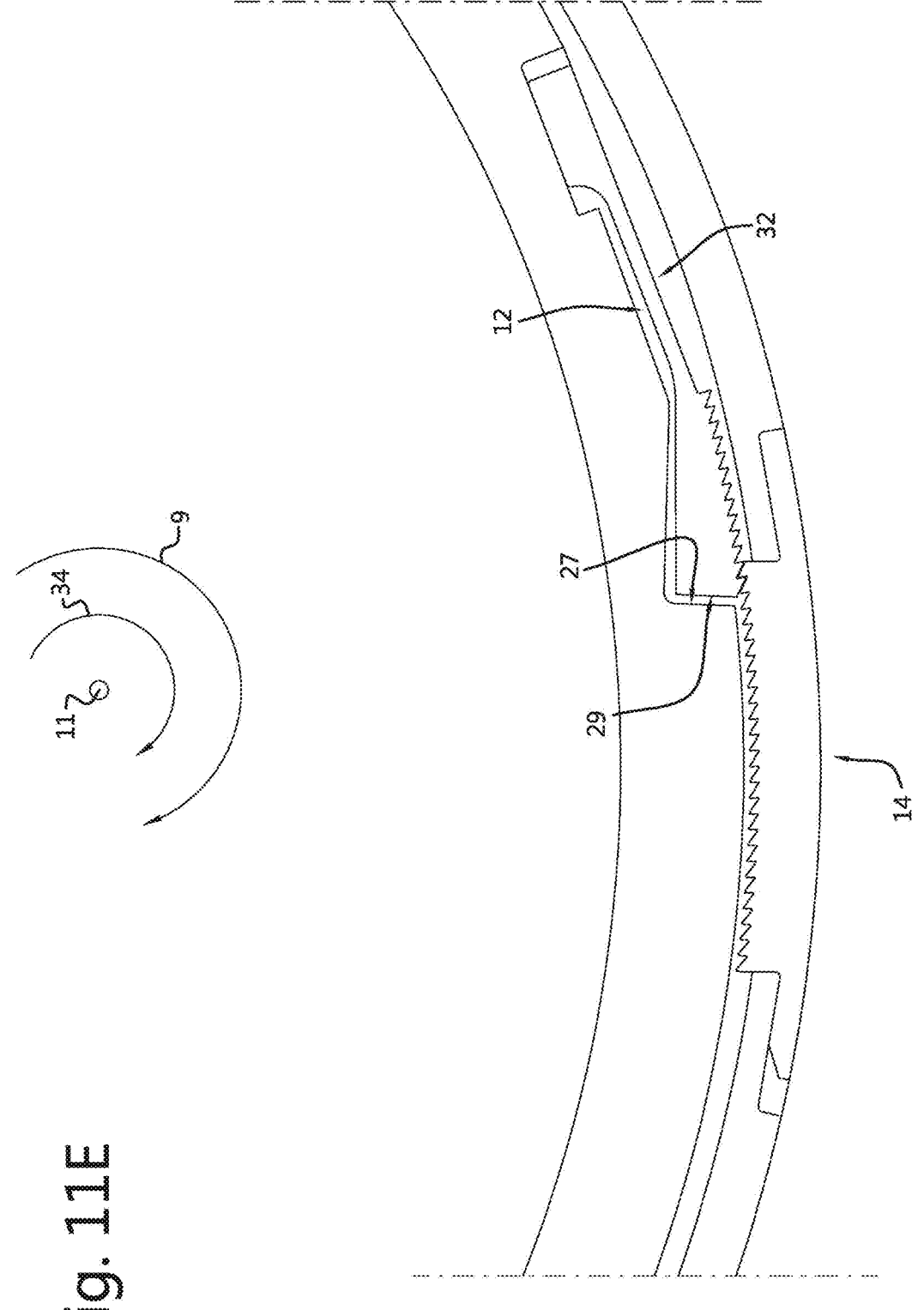
Figure 11F:
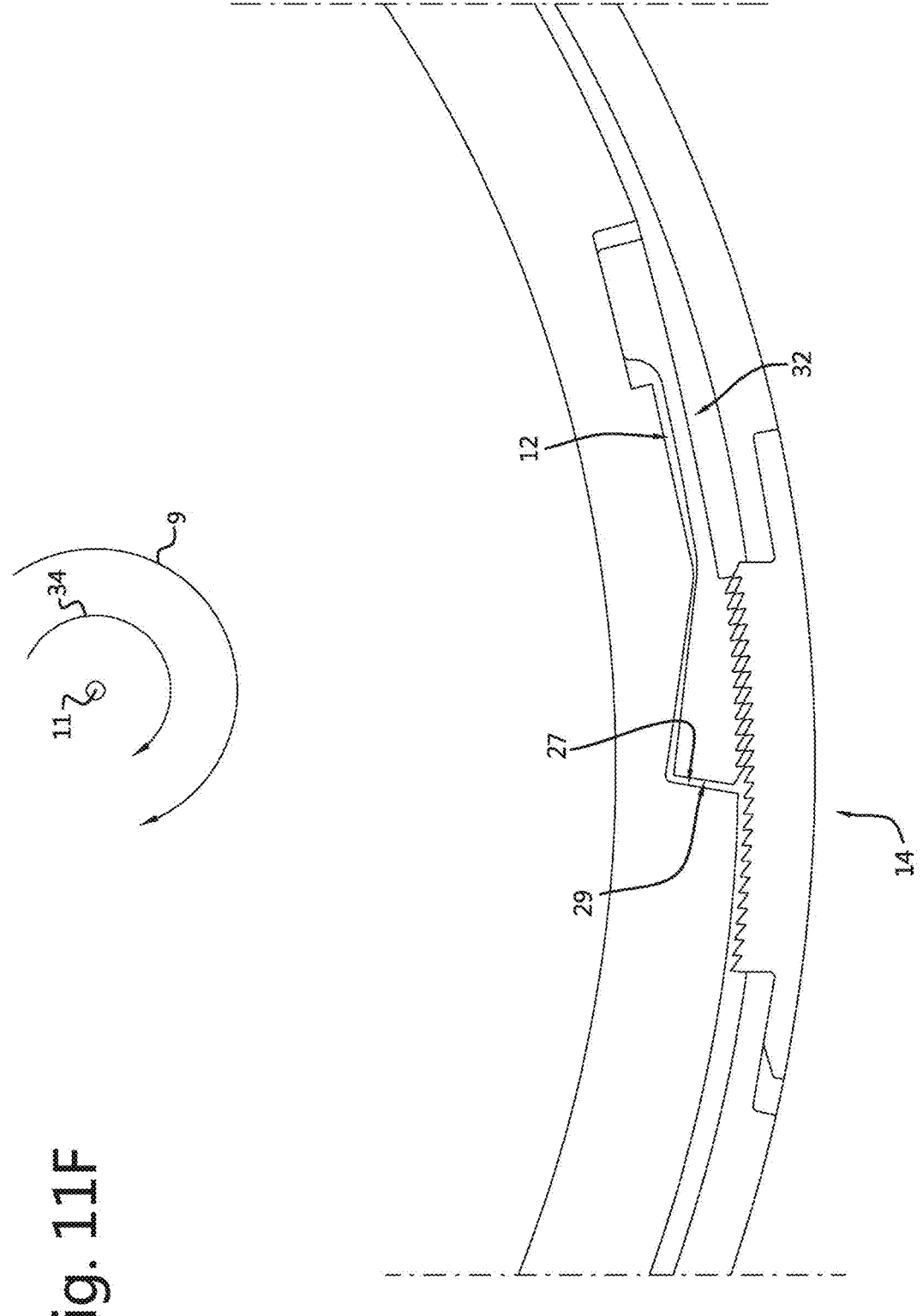
Figure 11G:
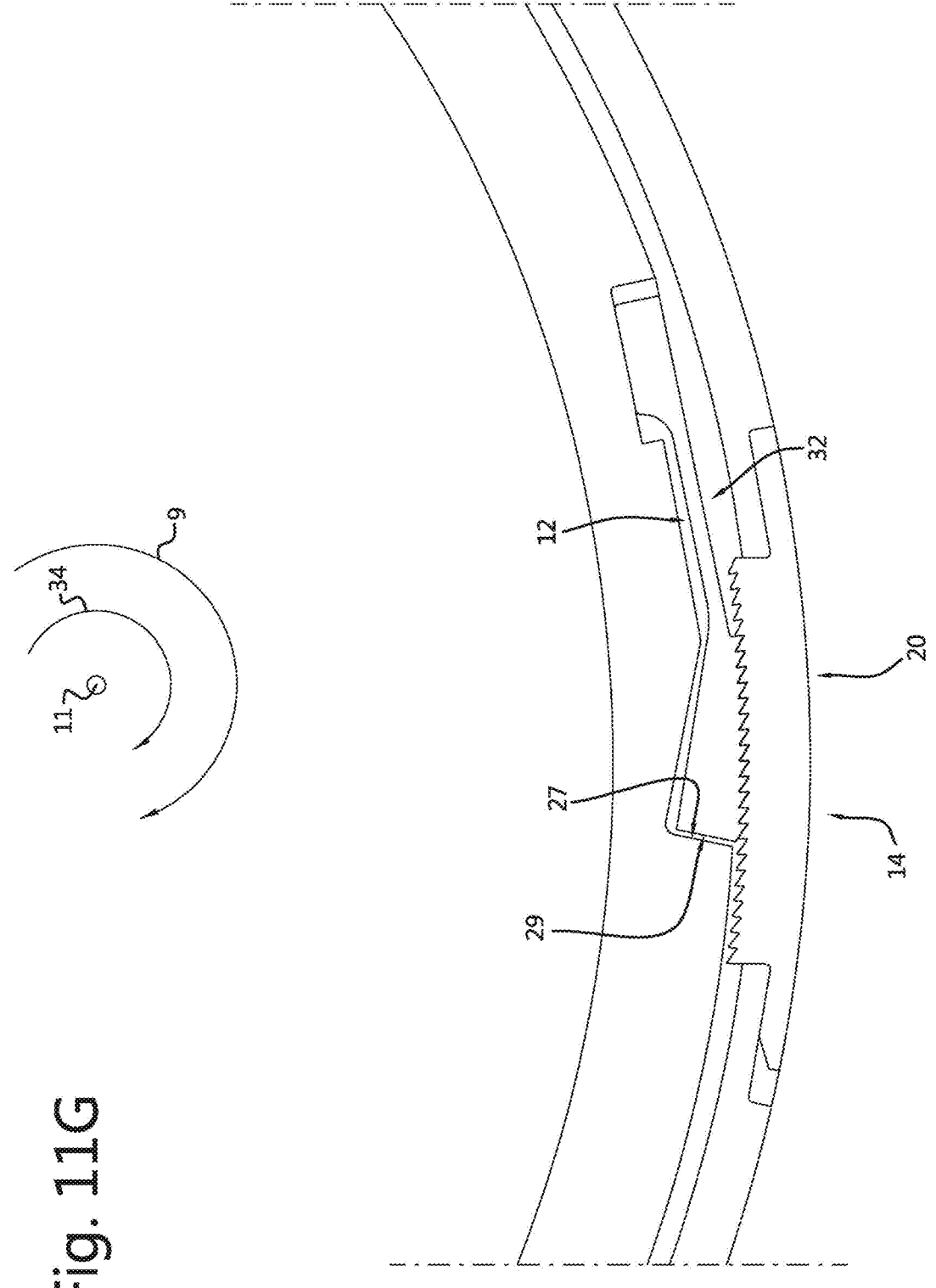

FIG. 10 shows a view in perspective of the first anti-rotation member 12 arranged in the first radial recess 13 provided in the pin 2 and the second anti-rotation member 14 arranged in the second radial recess 43 provided in the box 5 of the threaded connection 1 of FIG. 1.

This has the advantage that a relatively robust threaded connection 1 may be provided while the outer diameter thereof is kept relatively small. Said outer diameter of said threaded connection 1 may be defined by the outer dimensions of said box 5 in radial direction 23 with respect to said longitudinal axis 11 of said box 5. The first anti-rotation member 12 generally requires more space than the second anti-rotation member 14, in particular when said anti-rotation member is movable in tangential direction. By providing said first anti-rotation member 12 in said pin 2 and said second anti-rotation member 14 in said box 5, a relatively robust anti-rotation device 8 may be formed that is suitable to withstand operational torques while still maintaining a relatively small outer diameter. In addition, the insight was obtained that with said first anti-rotation member 12 being accommodated in said pin 2, the movable components (e.g. said spring part 21) are generally less exposed to environmental influences (e.g. to the dirty environment at a bore well).

In another embodiment of the threaded connection 1 according to the invention, the first anti-rotation member 12 arranged in the first radial recess 13 provided in the box 5 and the second anti-rotation member 14 arranged in the second radial recess 43 provided in the pin 2.

Figure 9A:
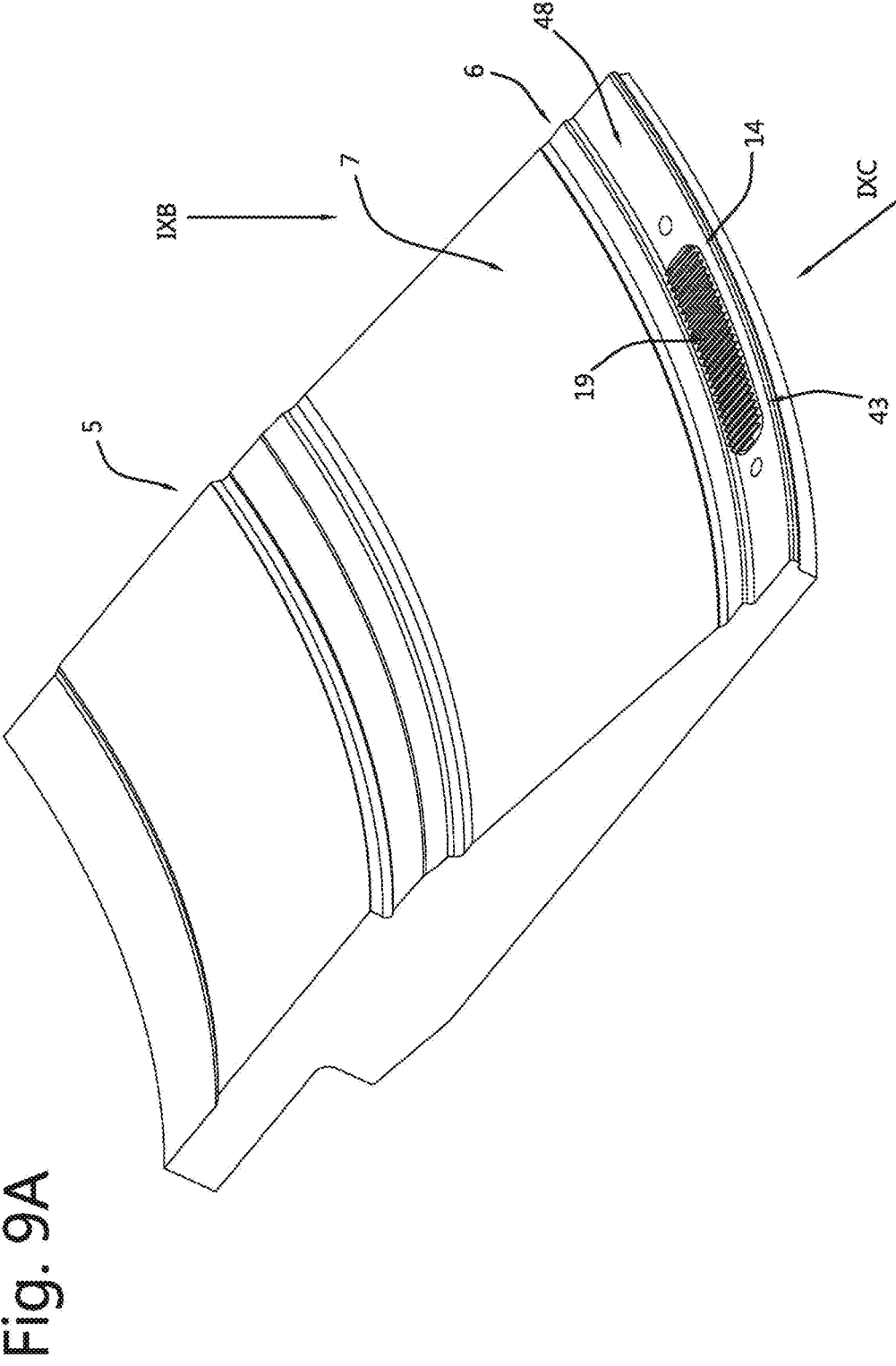
Figure 9B:
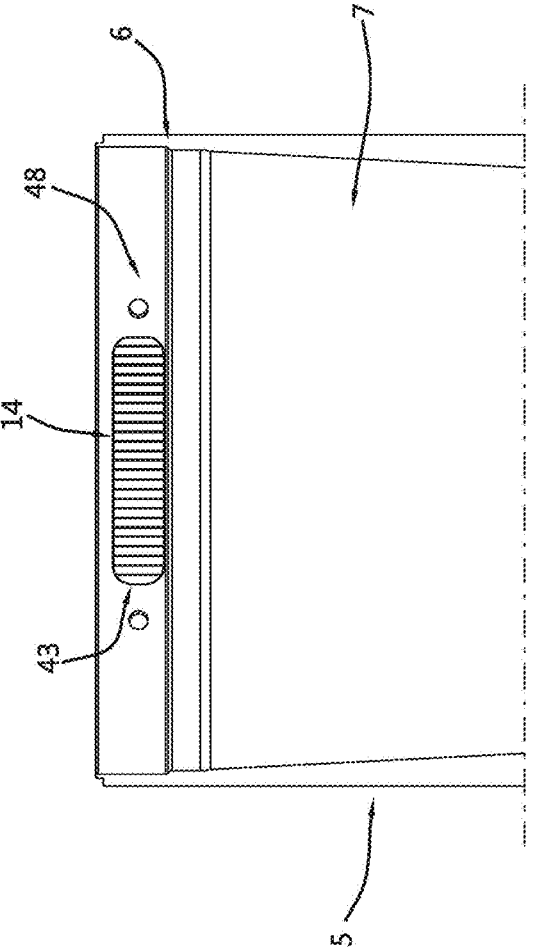
Figure 9C:
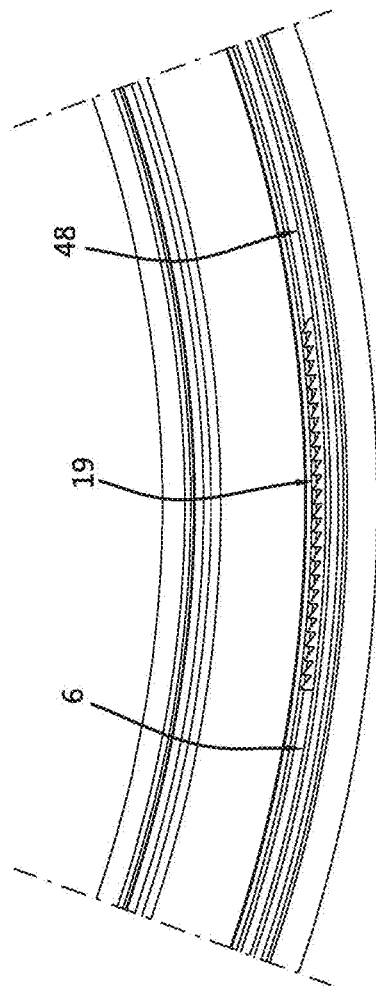

As shown in FIG. 9C, the second ratchet teeth 17 of the second anti-rotation member 14 extend in radial direction 23 beyond the box inner surface 6.

The FIGS. 11A-11G show the method of making up the threaded connection 1 of FIG. 1. Said method comprises the step of activating the anti-rotation device 8 of the threaded connection 1 by relative rotation between the pin 2 and the box 5 in the make-up rotation direction 9 until final make-up 20 of the threaded connection 1 is reached.

The first recess contact surface 27 and the first member contact surface 29 are configured to direct forces from the first ratchet teeth 17 of the first ratchet part 16 towards the second ratchet teeth 19 of the second ratchet part 18 and/or from the second ratchet teeth 19 of the second ratchet part 18 towards the first ratchet teeth 17 of the first ratchet part 16. Said recess contact surface is faced towards the first ratchet part and the second ratchet part.

FIG. 12 shows a finite element analysis of the situation that the anti-rotation device 8 of the threaded connection 1 of FIG. 1 has been activated and a break-out torque 35 is applied to the pin 2 and the box 5 in the break-out rotation direction 10. FIG. 12 indicates amongst others that the forces are distributed homogeneously through the first anti-rotation member 12, due to which a relatively robust anti-rotation device 8 is provided.

In particular, forces as a result of break-out torque 35 are mainly directed via the first recess contact surface 27 of the pin 2, the first member contact surface 29 of the first ratchet part 16, the first ratchet teeth 17 of the first ratchet part 16, the second ratchet teeth 19 of the second ratchet part 18, the second anti-rotation member 14, and second member support surfaces 22 of the box 5.

An alternative embodiment of the threaded connection according to the invention is shown in the FIGS. 13-18. In said alternative embodiment, the first anti-rotation member 12 is arranged in the first radial recess 13 being provided in the inner box surface 6 of the box 5, and the second anti-rotation member 14 is provided at the outer pin surface 3 of the pin 2.

Figure 14A:
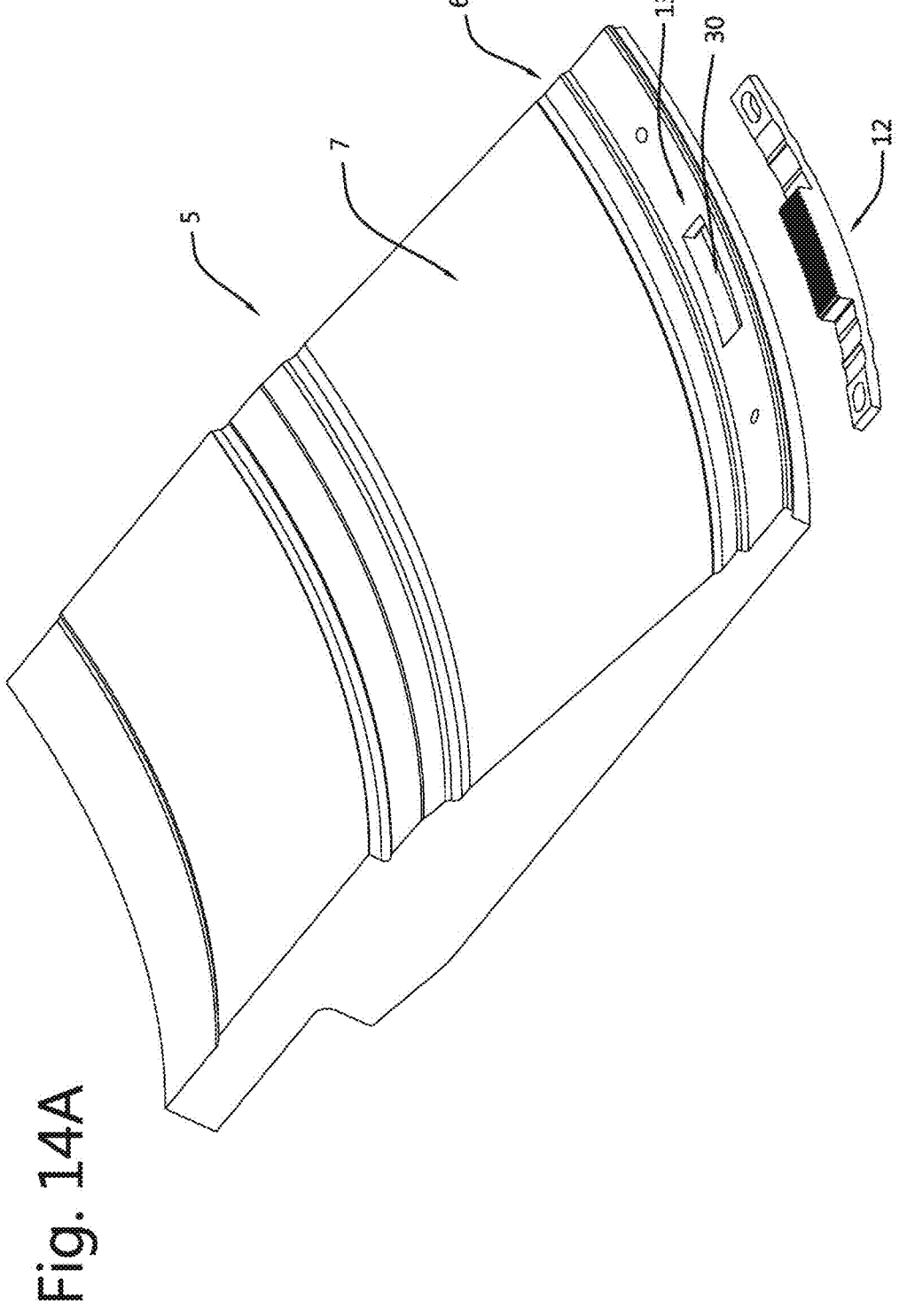
Figure 14B:
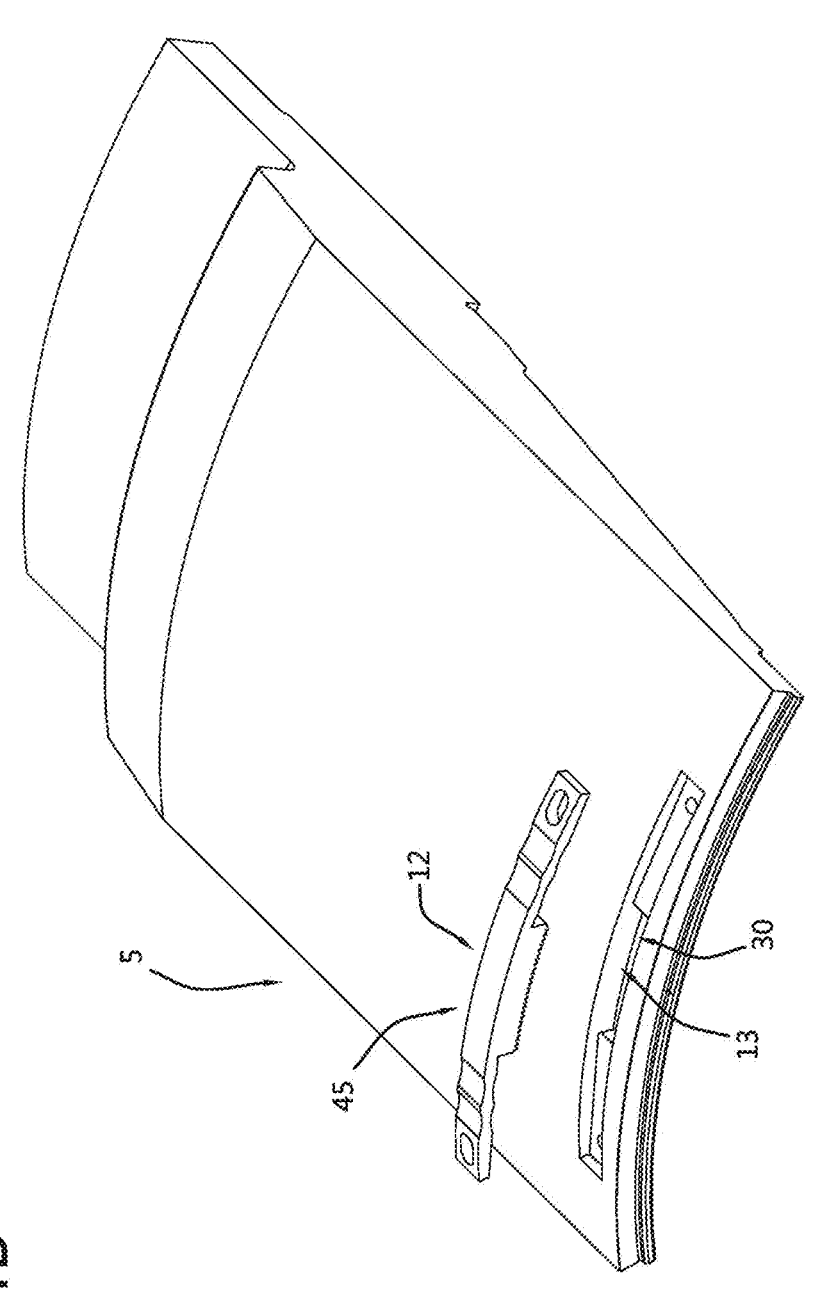
Figure 15A:
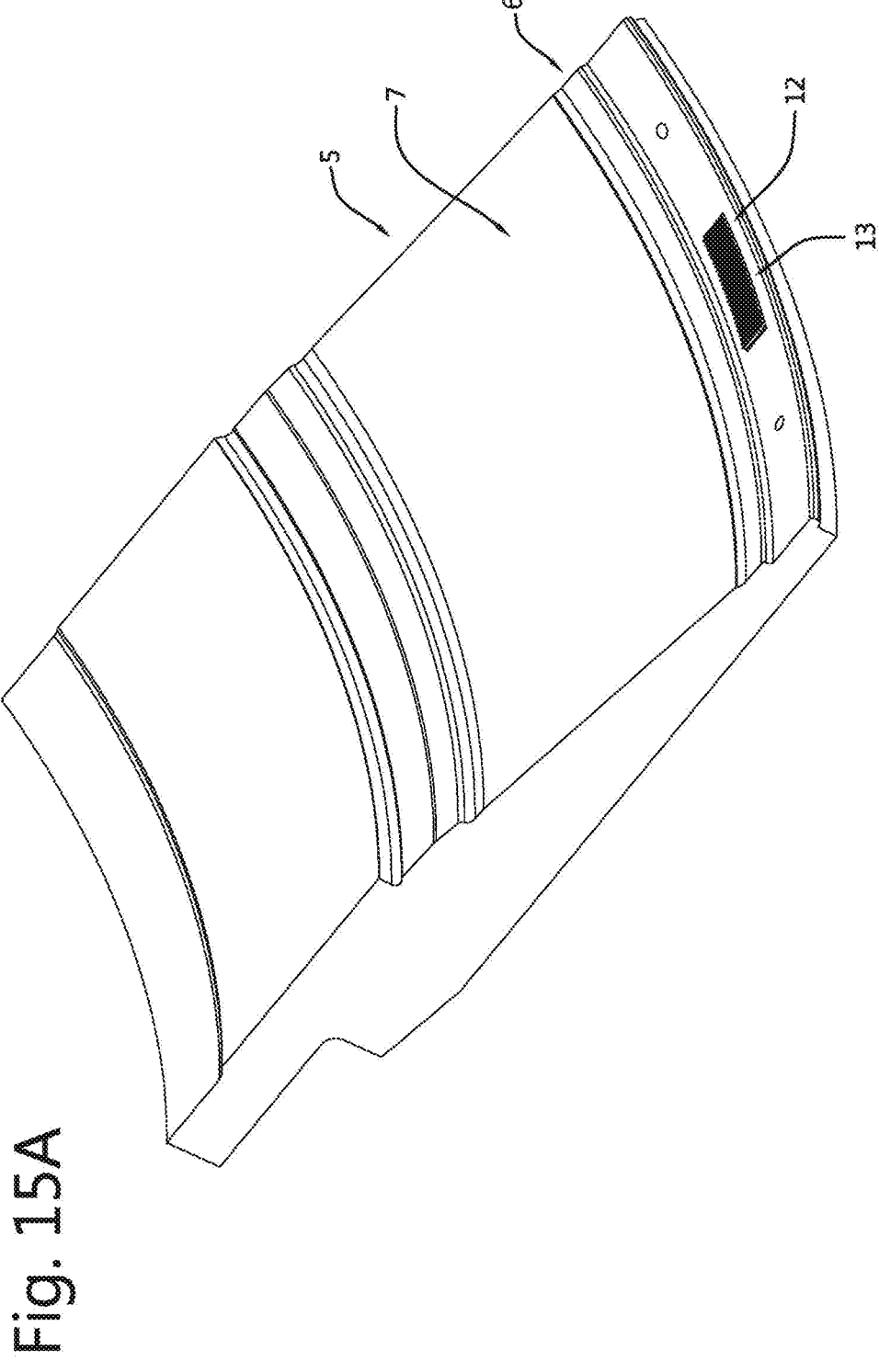
Figure 15B:
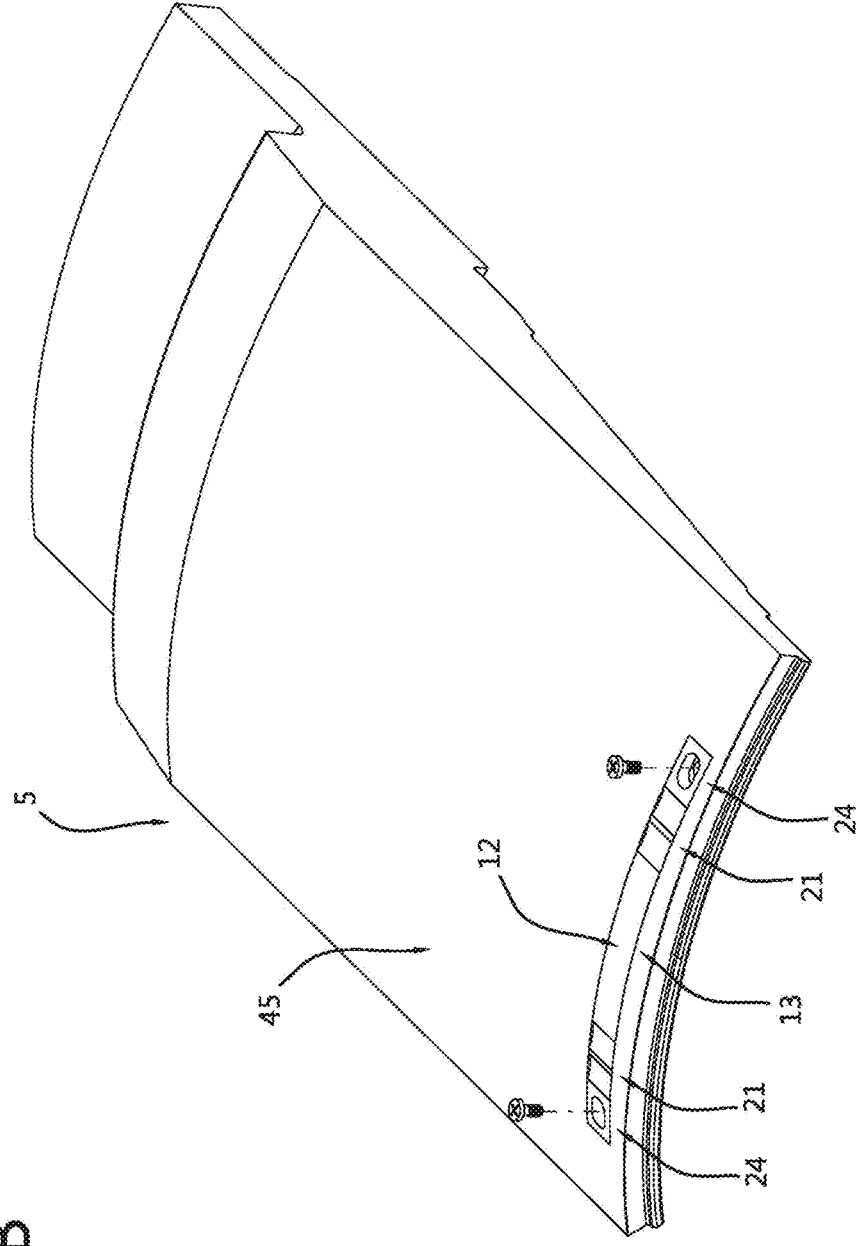

The FIGS. 13A-D show the first anti-rotation member 12 having two spring parts 21 located at opposite sides of the first ratchet part 16. The FIGS. 14A-B show the first radial recess 13 provided in the box 5. The FIGS. 15A-B shown the first anti-rotation member 13 being arranged in the first radial recess 13.

The first radial recess 13 comprises a first recess through hole 30 in which the first ratchet part 16 of the first anti-rotation member 12 is located. The first anti-rotation member 12 comprises two first mounting parts 24 to releasable mount the first anti-rotation member 12 to the box 5. The two first mounting parts 24 are releasable mounted to the box 5 at the outer box surface 45. The two first mounting parts 24 are located at opposite sides of the first radial recess 13.

The first anti-rotation member 12 comprises two spring parts 21 which together allow radial movement of the first ratchet part 16 in radial direction 23 relative to the longitudinal axis 11 when first ratchet teeth 17 slide along second ratchet teeth 19 during relative rotation between the pin 2 and the box 5 in the make-up rotation direction 9. Each spring part 21 is located between the first ratchet part 16 and a different one of the two first mounting parts 24. The spring parts 21 have a varying radial spring thickness 51. In particular, each of the spring parts 21 has two radially narrowed sections.

The first ratchet part 16, the two spring parts 21 and the two first mounting parts 24 of the first anti-rotation member 12 are integrally formed.

Figure 16:
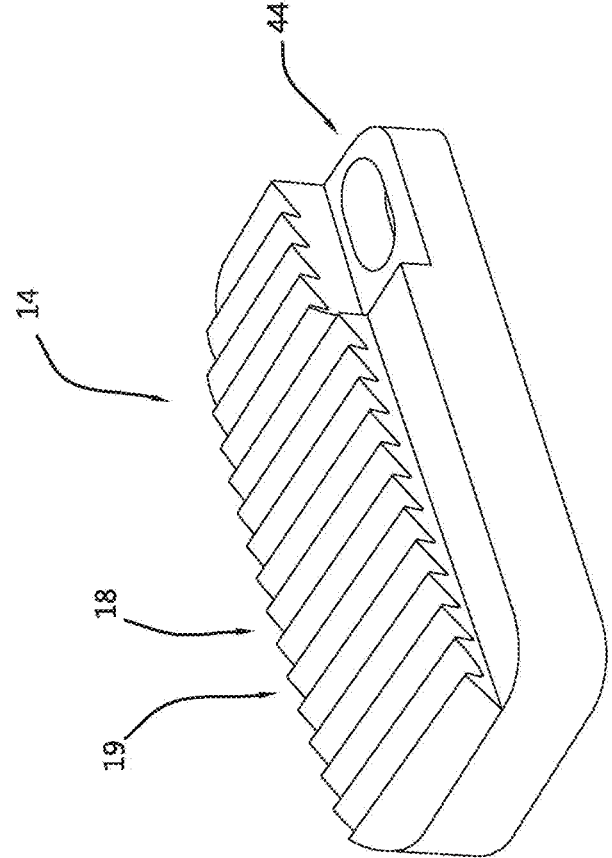
FIG. 16 schematically shows a view of the second anti-rotation member of the alternative embodiment of the threaded connection of FIG. 13A-D, FIG. 17 schematically shows a view of the second radial recess provided in the pin of the alternative embodiment of the threaded connection of FIG. 13A-D.
Figure 17:
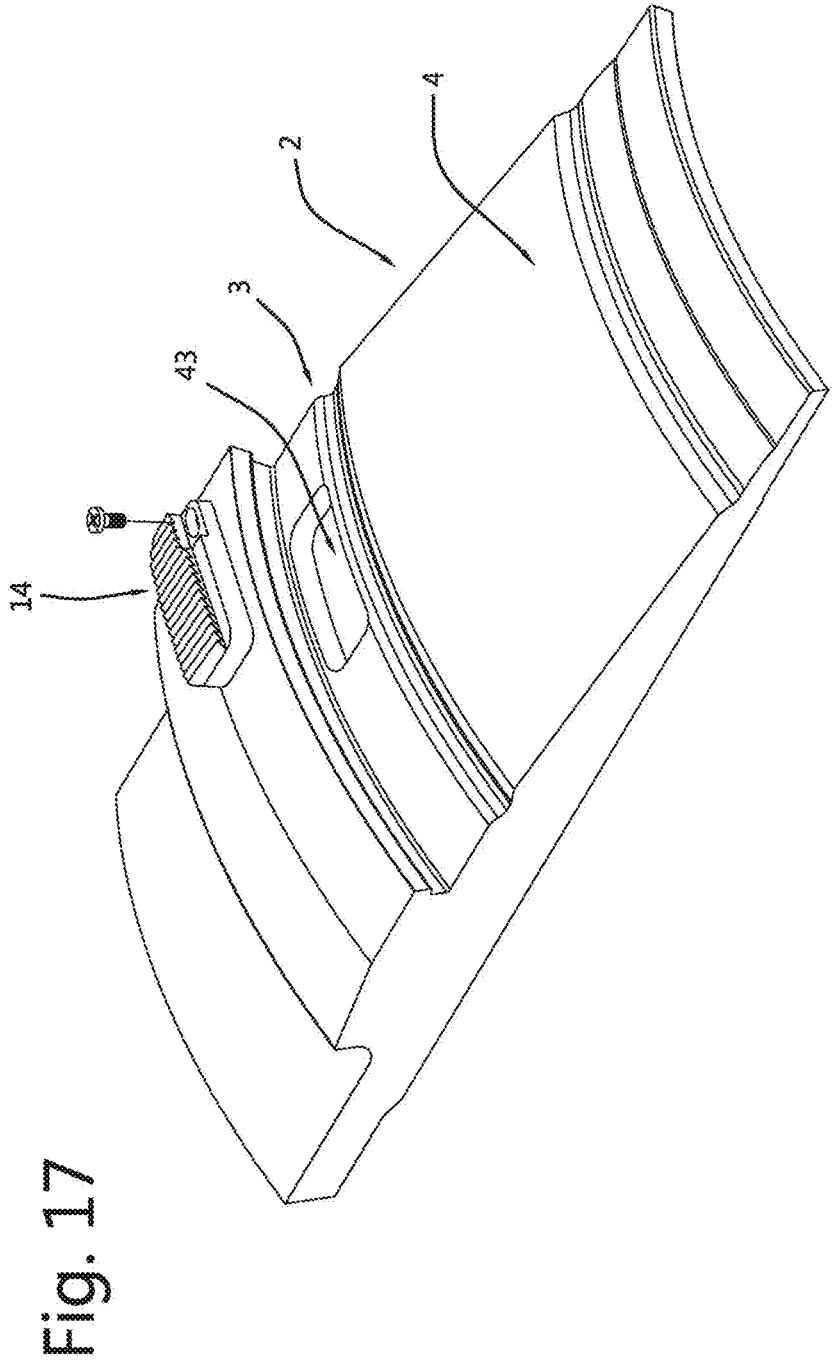
Figure 18:
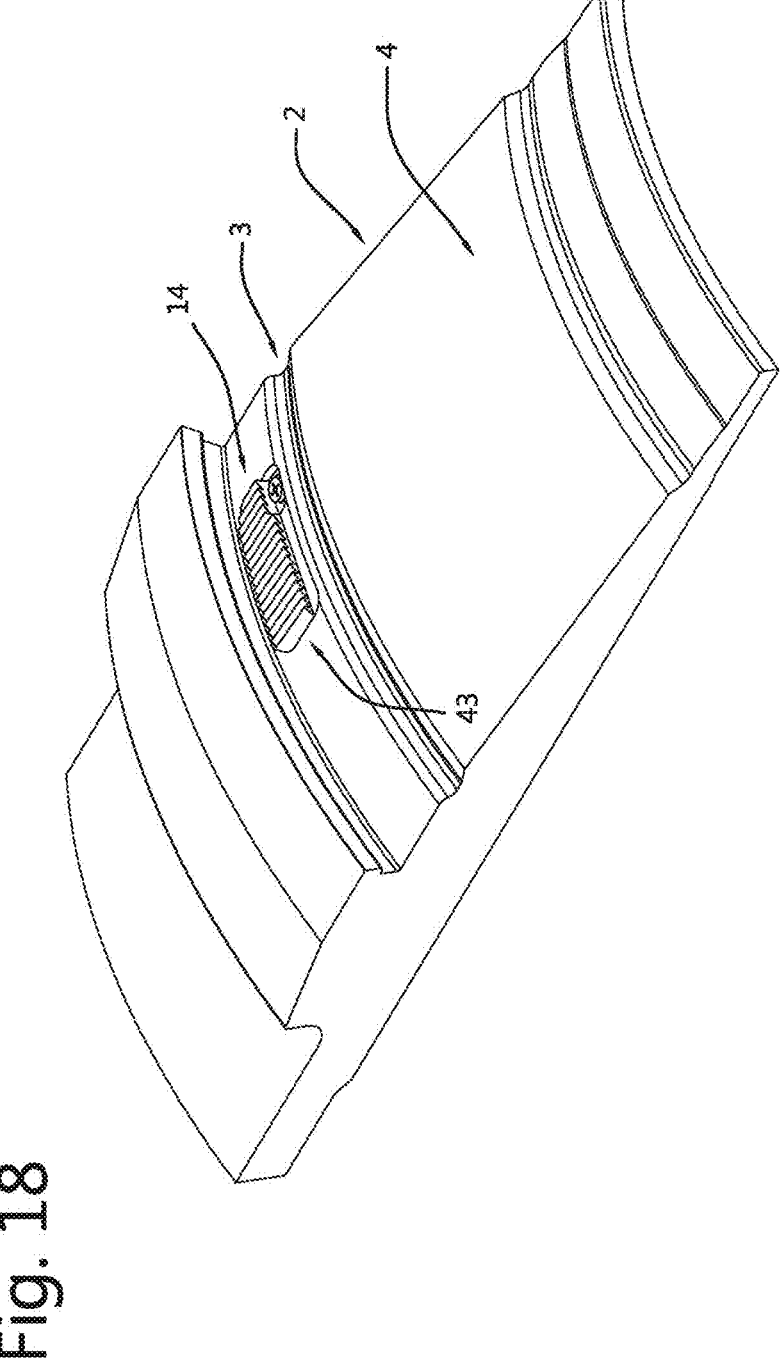
FIG. 18 schematically shows a view of the second anti-rotation member of the FIG. 16 arranged in the second radial recess of the FIGS. 17.

FIG. 16 shows the second anti-rotation member 14 and FIG. 17 shows the second radial recess 43 provided in the pin 2. FIG. 18 shows the second anti-rotation member 14 being arranged in the second radial recess 43. The second anti-rotation member 14 is releasable mounted in a second radial recess 43 being provided in the outer pin surface 3 of the pin 2.

The invention may further relate to a threaded connection, anti-rotation device and method according to any one of the following clauses.

1. Threaded connection for exploration and production of a hydrocarbon well, said threaded connection comprising:

a pin comprising an outer pin surface provided with an external thread, a box comprising an inner box surface provided with an internal thread for mating with the external thread during rotational make-up of the threaded connection, and an anti-rotation device to allow relative rotation between the pin and the box in a make-up rotation direction and prevent relative rotation between the pin and the box in an opposite break-out rotation direction, wherein:

the pin and the box extend along a longitudinal axis, the anti-rotation device comprises a releasable mounted first anti-rotation member which is arranged in a first radial recess provided in one of the outer pin surface of the pin and the inner box surface of the box, and a second anti-rotation member provided at the other of the outer pin surface of the pin and the inner box surface of the box, the first anti-rotation member comprises a first ratchet part provided with radially extending first ratchet teeth,

US 12,698,683 B2

17
18 the second anti-rotation member comprises a second ratchet part provided with radially extending second ratchet teeth which engage the first ratchet teeth of the first anti-rotation member at final make-up of the threaded connection, and the first anti-rotation member comprises a spring part which allows radial movement of the first ratchet part in radial direction relative to the longitudinal axis when first ratchet teeth slide along second ratchet teeth during relative rotation between the pin and the box in the make-up rotation direction.

2. Threaded connection according to clause 1, wherein the first ratchet part and the spring part of the first anti-rotation member are integrally formed.

3. Threaded connection according to clause 1 or 2, wherein the spring part has a spring stiffness which is smaller than a first ratchet stiffness of the first ratchet part.

4. Threaded connection according to any one of the preceding clauses, wherein the first anti-rotation member comprises a first mounting part to releasable mount the first anti-rotation member in the first radial recess.

5. Threaded connection according to clause 4, wherein the first mounting part comprises a first mounting through hole to receive a first mounting member, such as a first screw, which releasable mounts the first anti-rotation member to said one of the pin and box in which the first radial recess is provided.

6. Threaded connection according to clause 4 or 5, wherein the first ratchet part, the spring part and the first mounting part of the first anti-rotation member are integrally formed.

7. Threaded connection according to clause 6, wherein the spring part has a spring stiffness which is smaller than a first ratchet stiffness of the first ratchet part and/or smaller than a first mounting stiffness of the first mounting part.

8. Threaded connection according to any one of the clauses 4-7, wherein:

9. —a first recess contact surface of the pin and the box in which the first radial recess is provided defines a first recess boundary of the first radial recess, —the first anti-rotation member comprises a first member contact surface facing the first recess contact surface, and—the first mounting part is configured to allow tangential movement in a tangential direction relative to the longitudinal axis of the first anti-rotation member in the first radial recess from a first tangential member position wherein the first member contact surface of the first anti-rotation member is in contact with the first recess contact surface into a second tangential member position wherein the first member contact surface of the first anti-rotation member is located at a first tangential member distance from the first recess contact surface, and vice versa.

10. Threaded connection according to clause 8, wherein the first recess contact surface and the first member contact surface are configured to distribute forces as a result of a break-out torque applied to the pin and the box in the break-out rotation direction mainly through the teeth of the first ratchet part and the second ratchet part.

11. Threaded connection according to clause 8 or 9, wherein the first recess contact surface and the first member contact surface are configured to direct forces from the first ratchet teeth of the first ratchet part towards the second ratchet teeth of the second ratchet part and/or from the second ratchet teeth of the second ratchet part towards the first ratchet teeth of the first ratchet part.

12. Threaded connection according to any one of the clause 8-10, wherein said recess contact surface is faced towards the first ratchet part.

13. Threaded connection according to any one of the clauses 8-10, wherein the first recess contact surface is faced towards the first ratchet part and the second ratchet part.

14. Threaded connection according to any one of the clauses 8-12, wherein the second anti-rotation member is configured to push the first anti-rotation member: —into the second tangential member position when a predetermined make-up torque is applied to the pin and the box in the make-up rotation direction, and—into the first tangential member position when a predetermined break-out torque is applied to the pin and the box in the break-out rotation direction.

15. Threaded connection according to clause 13, wherein second ratchet teeth which engage first ratchet teeth push the first anti-rotation member: —into the second tangential member position when the predetermined make-up torque is applied, and—into the first tangential member position when the predetermined break-out torque is applied.

16. Threaded connection according to any one of the clauses 8-14, wherein the first recess contact surface and the first member contact surface are configured to create a radial counter force acting against radial movement of the first ratchet part in radial direction relative to the longitudinal axis when the first anti-rotation member is located in the first tangential member position and a break-out torque is applied to the pin and the box in the break-out rotation direction.

17. Threaded connection according to clause 15, wherein the radial counter force is formed by a friction force between the first recess contact surface and the first member contact surface when the break-out torque is applied to the pin and the box in the break-out rotation direction.

18. Threaded connection according to any one of the clauses 8-16 and in combination with clause 4, wherein the first mounting through hole is in tangential direction relative to the longitudinal axis larger than a first mounting portion of the first mounting member being surrounded by the first mounting through hole to allow movement of the first anti-rotation member in tangential direction and relative to the first mounting member.

19. Threaded connection according to clause 17, wherein the first mounting through hole has an elongate form in tangential direction relative to the longitudinal axis or a circular form.

20. Threaded connection according to any one of the clauses 8-18, wherein the first recess contact surface and the first member contact surface are configured to block tangential movement of the first anti-rotation member beyond the first tangential member position when a break-out torque is applied to the pin and the box in the break-out rotation direction.

21. Threaded connection to clause 19 and in combination with clause 17 or 18, wherein the first mounting through hole is dimensioned to avoid forces in tangential direction working on the first mounting member by the first anti-rotation member being located in the first tangential member position when a break-out torque is applied to the pin and the box in the break-out rotation direction.

22. Threaded connection according to any one of the clauses 8-20, wherein the first tangential member distance allows radial movement of the first ratchet part in radial direction relative to the longitudinal axis when first ratchet teeth slide along second ratchet teeth during relative rotation between the pin and the box in the make-up rotation direction.

23. Threaded connection according to any one of the clauses 8-21, wherein the first mounting part comprises a first mounting slide surface surrounding the first mounting through hole and being in contact with a corresponding first recess slide surface provided at the first radial recess to facilitate the tangential movement of the first anti-rotation member from the first tangential member position into the second tangential member position, and vice versa.

24. Threaded connection according to any one of the clauses 8-22, wherein the spring part of the first anti-rotation member is in tangential direction relative to the longitudinal axis located between the first ratchet part and the first mounting part.

25. Threaded connection according to any one of the clauses 8-23, wherein the first member contact surface of the first anti-rotation member is located at the first ratchet part and the first ratchet teeth are in tangential direction relative to the longitudinal axis located between the first member contact surface and the spring part.

26. Threaded connection according to clause 24, wherein a radial first ratchet thickness of the first ratchet part increases in tangential direction relative to the longitudinal axis from the spring part to the first member contact surface.

27. Threaded connection according to any one of the clauses 8-25, wherein the first anti-rotation member is only mounted to said one of the pin and the box in which the first radial recess is provided via the first mounting part.

28. Threaded connection according to any one of the clauses 8-26, wherein the first anti-rotation member comprises one, and only one, first mounting part.

29. Threaded connection according to any one of the clauses 8-27, wherein the first anti-rotation member comprises one, and only one, spring part.

30. Threaded connection according to any one of the preceding clauses, wherein the second ratchet part of the second anti-rotation member is fixed in radial direction relative to the longitudinal axis 31. Threaded connection according to any one of the preceding clauses, wherein the second anti-rotation member is releasable mounted in a second radial recess provided in said other of the outer pin surface of the pin and the inner box surface of the box.

32. Threaded connection according to any one of the preceding clauses, wherein the first anti-rotation member is arranged in the first radial recess being provided in the outer pin surface of the pin, and the second anti-rotation member is provided at the inner box surface of the box.

33. Threaded connection according to clause 31, wherein the second anti-rotation member is releasable mounted in a second radial recess being provided in the inner box surface of the box.

34. Threaded connection according to clause 32, wherein the second radial recess comprises a second recess through hole in which the second ratchet part of the second anti-rotation member is located.

35. Threaded connection according to clause 32 or 33, wherein the second anti-rotation member comprises at least one second mounting part to releasable mount the second anti-rotation member to the box.

36. Threaded connection according to clause 34, wherein the box comprises an outer box surface and the at least one second mounting part is releasable mounted to the box at the outer box surface.

37. Threaded connection according to clause 34 or 35, wherein the second anti-rotation member comprises two second mounting parts to releasable mount the second anti-rotation member to the box.

38. Threaded connection according to clause 36, wherein the two second mounting parts are located at opposite sides of the second radial recess.

39. Threaded connection according to any one of the clauses 1-30, wherein the first anti-rotation member is arranged in the first radial recess being provided in the inner box surface of the box, and the second anti-rotation member is provided at the outer pin surface of the pin.

40. Threaded connection according to clause 38, wherein the second anti-rotation member is releasable mounted in a second radial recess being provided in the outer pin surface of the pin.

41. Threaded connection according to clause 38 or 39, wherein the first radial recess comprises a first recess through hole in which the first ratchet part of the first anti-rotation member is located.

42. Threaded connection according to any one of the clauses 38-40, wherein the first anti-rotation member comprises at least one first mounting part to releasable mount the first anti-rotation member to the box 43. Threaded connection according to clause 41, wherein the box comprises an outer box surface and the at least one first mounting part is releasable mounted to the box at the outer box surface.

44. Threaded connection according to clause 41 or 42, wherein the first anti-rotation member comprises two first mounting parts to releasable mount the first anti-rotation member to the box.

45. Threaded connection according to clause 43, wherein the two first mounting parts are located at opposite sides of the first radial recess.

46. Threaded connection according to clause 43 or 44, wherein the first anti-rotation member comprises two spring parts which together allow radial movement of the first ratchet part in radial direction relative to the longitudinal axis when first ratchet teeth slide along second ratchet teeth during relative rotation between the pin and the box in the make-up rotation direction.

47. Threaded connection according to clause 45, wherein each spring part is located between the first ratchet part and a different one of the two first mounting parts.

48. Threaded connection according to clause 45 or 46, wherein each spring part has a varying radial spring thickness, such as two radially narrowed sections.

49. Threaded connection according to any one of the preceding clauses, wherein the anti-rotation device is configured to be activated by relative rotation between the pin and the box in the make-up rotation direction until final make-up of the threaded connection is reached.

50. Threaded connection according to any one of the preceding clauses, wherein the first ratchet teeth and the second ratchet teeth extend in opposite radial directions relative to the longitudinal axis when engaging each other at final make-up of the threaded connection.

51. Threaded connection according to any one of the preceding clauses, wherein the first ratchet teeth of the first anti-rotation member extend in radial direction beyond the one of the pin outer surface and the box inner surface in which the first radial recess is provided, and the second ratchet teeth of the second anti-rotation member extend in radial direction beyond the other of the pin outer surface and the box inner surface at which the second anti-rotation member is provided.

52. Threaded connection according to any one of the preceding clauses, wherein the first radial recess extends along part of a circumference of said one of the outer pin surface of the pin and the inner box surface of the box.

53. Threaded connection according to any one of the preceding clauses, wherein the second radial recess extends along part of a circumference of said other of the outer pin surface of the pin and the inner box surface of the box.

54. Threaded connection according to any one of the preceding clauses, wherein the radial movement relative to the longitudinal axis of the first ratchet part moves the first ratchet teeth radially relative to the second ratchet teeth.

55. Method of making up a threaded connection for exploration and production of a hydrocarbon well, comprising the step of activating the anti-rotation device of the threaded connection according to any of the preceding clauses by relative rotation between the pin and the box in the make-up rotation direction until final make-up of the threaded connection is reached.

56. Anti-rotation device for a threaded connection for exploration and production of a hydrocarbon well, said threaded connection comprising a pin comprising an outer pin surface provided with an external thread, and a box comprising an inner box surface provided with an internal thread for mating with the external thread during rotational make-up of the threaded connection, which pin and the box extend along a longitudinal axis, and wherein: —the anti-rotation device is configured to allow relative rotation between the pin and the box in a make-up rotation direction and prevent relative rotation between the pin and the box in an opposite break-out rotation direction, —the anti-rotation device comprises a releasable mounted first anti-rotation member which is arranged in a first radial recess provided in one of the outer pin surface of the pin and the inner box surface of the box, and a second anti-rotation member provided at the other of the outer pin surface of the pin and the inner box surface of the box, —the first anti-rotation member comprises a first ratchet part provided with radially extending first ratchet teeth, —the second anti-rotation member comprises a second ratchet part provided with radially extending second ratchet teeth which engage the first ratchet teeth of the first anti-rotation member at final make-up of the threaded connection, and—the first anti-rotation member comprises a spring part which allows radial movement of the first ratchet part in radial direction relative to the longitudinal axis when first ratchet teeth slide along second ratchet teeth during relative rotation between the pin and the box in the make-up rotation direction.

As required, detailed embodiments of the present invention are disclosed in the figures; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The terms "a" or "an", as used herein, are defined as one or more than one. The terms multiple and plurality, as used herein, is defined as two or more than two. The term another, as used herein, is defined as at least a second or more. The terms including and/or having, as used herein, are defined as comprising (i.e., open language, not excluding other elements or steps). Any reference signs in the claims should not be construed as limiting the scope of the claims or the invention.

It will be apparent to those skilled in the art that various modifications can be made to the shown threaded connection, anti-rotation device, and method according to the invention without departing from the scope as defined in the claims.

The invention claimed is:

1. A threaded connection for exploration and production of a hydrocarbon well, said threaded connection comprising:
   a pin comprising an outer pin surface provided with an external thread;
   a box comprising an inner box surface provided with an internal thread for mating with the external thread during rotational make-up of the threaded connection; and
   an anti-rotation device to allow relative rotation between the pin and the box in a make-up rotation direction and prevent relative rotation between the pin and the box in an opposite break-out rotation direction;
   wherein:
   the pin and the box extend along a longitudinal axis;
   the anti-rotation device comprises a first anti-rotation member which is arranged in a first radial recess provided in one of the outer pin surface of the pin and the inner box surface of the box, and a second anti-rotation member provided at the other of the outer pin surface of the pin and the inner box surface of the box;
   the first anti-rotation member comprises a first ratchet part provided with first ratchet teeth;
   the second anti-rotation member comprises a second ratchet part provided with second ratchet teeth which engage the first ratchet teeth of the first anti-rotation member at final make-up of the threaded connection;
   the first anti-rotation member comprises a spring part which allows radial movement of the first ratchet part in a radial direction relative to the longitudinal axis when first ratchet teeth slide along second ratchet teeth during relative rotation between the pin and the box in the make-up rotation direction;
   the first anti-rotation member is slidable relative to the first radial recess from a first tangential member position to a second tangential member position;
   a first recess contact surface of the pin and the box in which the first radial recess is provided defines a first recess boundary of the first radial recess;
   the first anti-rotation member comprises a first member contact surface facing the first recess contact surface; and
   in the first tangential member position, the first member contact surface of the first anti-rotation member is in contact with the first recess contact surface.

2. The threaded connection of claim 1, wherein the first anti-rotation member comprises a first mounting part to releasably mount the first anti-rotation member in the first radial recess.

3. The threaded connection of claim 2, wherein the first mounting part comprises a first mounting through hole to receive a first mounting member which releasably mounts the first anti-rotation member to said one of the pin and box in which the first radial recess is provided.

4. The threaded connection of claim 3, wherein the first mounting through hole is in a tangential direction relative to the longitudinal axis larger than a first mounting portion of the first mounting member being surrounded by the first mounting through hole to allow movement of the first anti-rotation member in a tangential direction relative to the first mounting member.

5. The threaded connection of claim 4, wherein the first mounting through hole has an elongate form in tangential direction relative to the longitudinal axis or a circular form.

6. The threaded connection of claim 4, wherein the first mounting through hole is dimensioned to avoid forces in tangential direction working on the first mounting member by the first anti-rotation member being located in the first tangential member position when a break-out torque is applied to the pin and the box in the break-out rotation direction.

7. The threaded connection of claim 2, wherein the first ratchet part, the spring part and the first mounting part of the first anti-rotation member are integrally formed from a single piece of material.

8. The threaded connection of claim 1, wherein the first recess contact surface and the first member contact surface are configured to direct forces from the first ratchet teeth of the first ratchet part towards the second ratchet teeth of the second ratchet part and/or from the second ratchet teeth of the second ratchet part towards the first ratchet teeth of the first ratchet part.

9. The threaded connection of claim 1, wherein a radial first ratchet thickness of the first ratchet part increases in a tangential direction relative to the longitudinal axis from the spring part to the first member contact surface.

10. The threaded connection of claim 1, wherein the first anti-rotation member is arranged in the first radial recess being provided in the outer pin surface of the pin, and the second anti-rotation member is provided at the inner box surface of the box.

11. The threaded connection of claim 1, wherein:

the first mounting part comprises a first mounting slide surface surrounding the first mounting through hole;

the first radial recess comprises a first recess slide surface; and the first mounting slide surface is in contact with the first recess slide surface.

12. The threaded connection of claim 11, wherein the first recess slide surface is larger in a tangential direction than the first mounting slide surface.

13. The threaded connection of claim 1, wherein the first recess contact surface and the first member contact surface are configured to block tangential movement of the first anti-rotation member beyond the first tangential member position when a break-out torque is applied to the pin and the box in the break-out rotation direction.

14. A method of making up a threaded connection for exploration and production of a hydrocarbon well, said method comprising:

providing a threaded connection comprising:

a pin comprising an outer pin surface provided with an external thread;

a box comprising an inner box surface provided with an internal thread for mating with the external thread during rotational make-up of the threaded connection; and an anti-rotation device to allow relative rotation between the pin and the box in a make-up rotation direction and prevent relative rotation between the pin and the box in an opposite break-out rotation direction;

wherein:

the pin and the box extend along a longitudinal axis;

the anti-rotation device comprises a first anti-rotation member which is arranged in a first radial recess provided in one of the outer pin surface of the pin and the inner box surface of the box, and a second anti-rotation member provided at the other of the outer pin surface of the pin and the inner box surface of the box;

the first anti-rotation member comprises a first ratchet part provided with first ratchet teeth;

the second anti-rotation member comprises a second ratchet part provided with second ratchet teeth which engage the first ratchet teeth of the first anti-rotation member at final make-up of the threaded connection;

the first anti-rotation member comprises a spring part which allows radial movement of the first ratchet part in radial direction relative to the longitudinal axis when first ratchet teeth slide along second ratchet teeth during relative rotation between the pin and the box in the make-up rotation direction; and the first anti-rotation member is slidable relative to the first radial recess from a first tangential member position to a second tangential member position;

a first recess contact surface of the pin and the box in which the first radial recess is provided defines a first recess boundary of the first radial recess;

the first anti-rotation member comprises a first member contact surface facing the first recess contact surface; and in the first tangential member position, the first member contact surface of the first anti-rotation member is in contact with the first recess contact surface; and activating the anti-rotation device of the threaded connection by relative rotation between the pin and the box in the make-up rotation direction until final make-up of the threaded connection is reached.

15. The method of claim 14, wherein the first recess contact surface and the first member contact surface are configured to direct forces from the first ratchet teeth of the first ratchet part towards the second ratchet teeth of the second ratchet part and/or from the second ratchet teeth of the second ratchet part towards the first ratchet teeth of the first ratchet part.

* * * * *